United States Patent
Kim

(10) Patent No.: US 11,656,162 B2
(45) Date of Patent: *May 23, 2023

(54) DEVICE FOR ANALYZING DYNAMIC CHARACTERISTICS OF CARBON COMPOSITE MATERIAL BASED ON TEST TEMPERATURE, ORIENTATION OF CARBON MATERIAL, AND EXTERNAL LOADING PATTERN APPLIED THERETO, AND DYNAMIC CHARACTERISTICS ANALYSIS METHOD USING THE SAME

(71) Applicant: PUKYOUG NATIONAL UNIVERSITY INDUSTRY-UNIVERSITY COOPERATION FOUNDATION, Busan (KR)

(72) Inventor: Chan Jung Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 115 days.

This patent is subject to a terminal disclaimer.

(21) Appl. No.: 17/136,623

(22) Filed: Dec. 29, 2020

(65) Prior Publication Data

US 2022/0113235 A1   Apr. 14, 2022

(30) Foreign Application Priority Data

Oct. 8, 2020   (KR) .................. 10-2020-0129803

(51) Int. Cl.
*G01N 3/40*   (2006.01)
*B29C 70/22*   (2006.01)

(52) U.S. Cl.
CPC ............. *G01N 3/405* (2013.01); *B29C 70/22* (2013.01); *G01N 2203/0005* (2013.01);
(Continued)

(58) Field of Classification Search
CPC .......... G01N 3/405; G01N 2203/0005; G01N 2203/021; G01N 2203/0222;
(Continued)

(56) References Cited

U.S. PATENT DOCUMENTS

| 11,237,079 B2 * | 2/2022 | Kim ...................... G01M 7/022 |
| 2005/0092087 A1 * | 5/2005 | Kurt-Elli ............... G01M 7/025 331/1 R |

(Continued)

FOREIGN PATENT DOCUMENTS

| CN | 110133101 A * | 8/2019 | ............ G01N 29/04 |
| DE | 292321 A5 * | 7/1991 | |
| KR | 10-2018-0091873 | 8/2018 | |

*Primary Examiner* — Marrit Eyassu
(74) *Attorney, Agent, or Firm* — Norton Rose Fulbright US LLP

(57) ABSTRACT

Disclosed is a device for analyzing dynamic characteristics of a carbon composite material based on a test temperature, an orientation of a carbon material, and an external loading pattern applied thereto. The device includes a sensitivity analyzer configured to calculate a frequency response function of the carbon composite material based on a physical force signal and a vibration signal; and calculate a sensitivity of the carbon composite material to each of variations in the test temperature, an orientation of a carbon material contained in the carbon composite material, and the external loading pattern applied thereto, based on the calculated frequency response function.

20 Claims, 11 Drawing Sheets

(52) U.S. Cl.
CPC .................. *G01N 2203/021* (2013.01); *G01N 2203/0222* (2013.01); *G01N 2203/0688* (2013.01); *G01N 2203/0694* (2013.01)

(58) Field of Classification Search
CPC ... G01N 2203/0688; G01N 2203/0694; G01N 2203/0096; G01N 2203/0282; G01N 2203/0658; B29C 70/22
USPC .......................................................... 73/778
See application file for complete search history.

(56) References Cited

U.S. PATENT DOCUMENTS

2019/0017912 A1\* 1/2019 Farhad ..................... G01N 3/32
2021/0108911 A1\* 4/2021 Zhang ..................... G01N 21/65

\* cited by examiner

【FIG. 1】
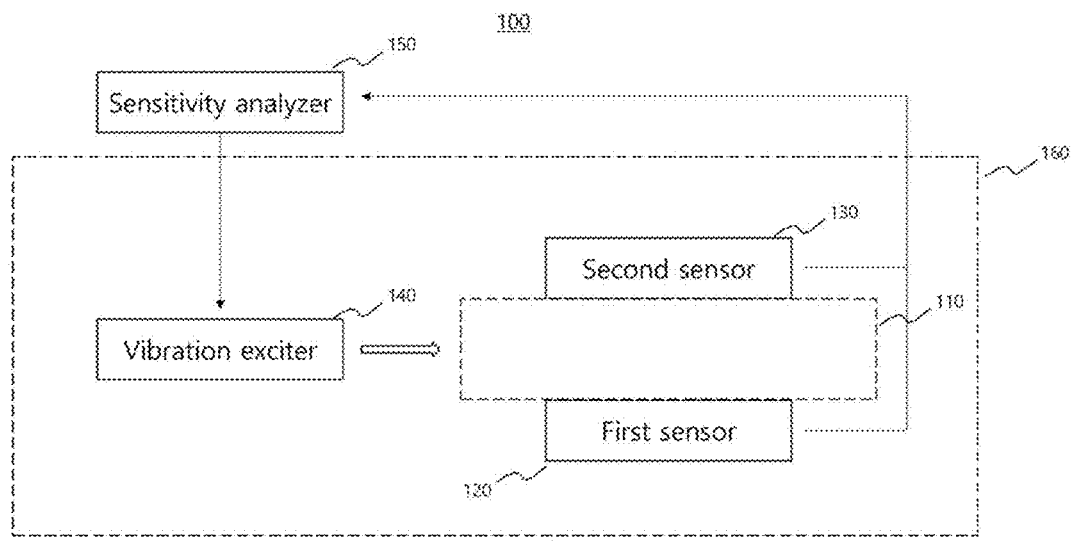
【FIG. 2】
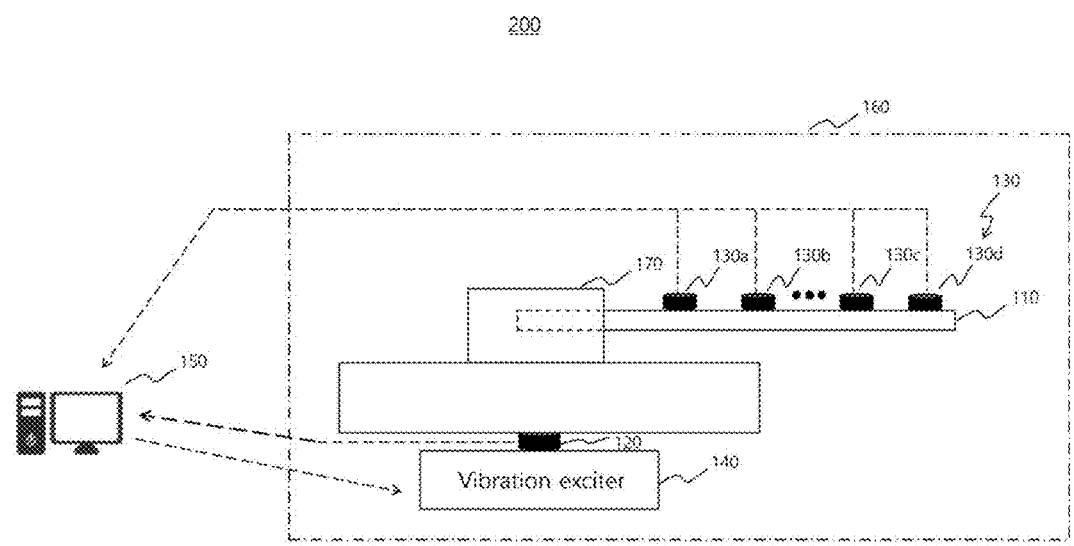

[FIG. 3A]
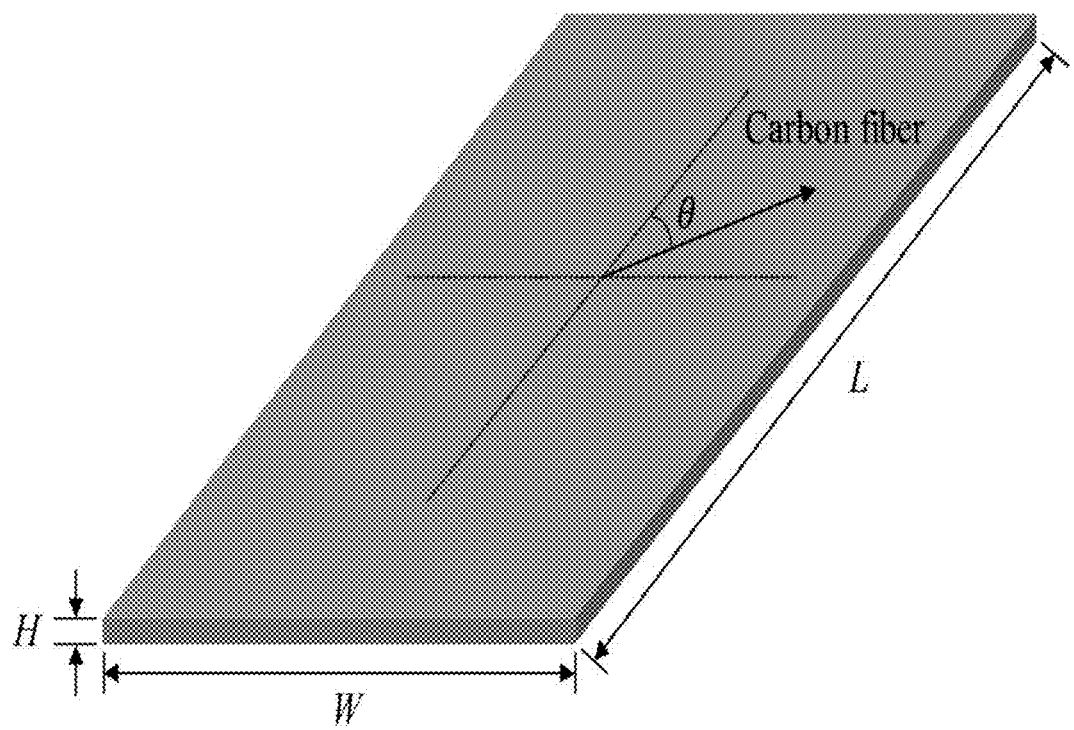
[FIG. 3B]
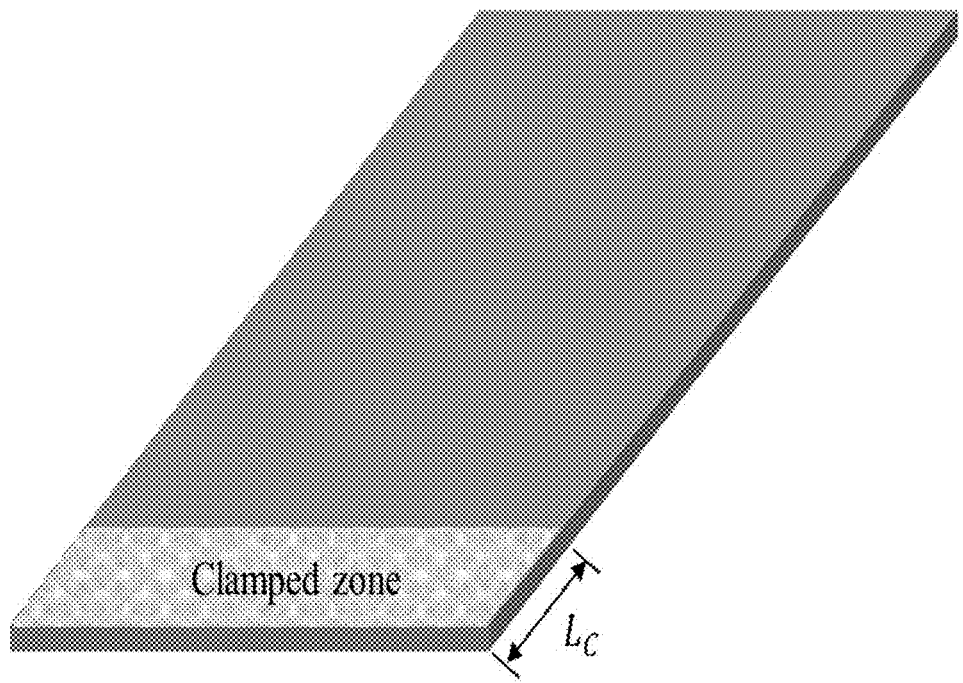

[FIG. 5]
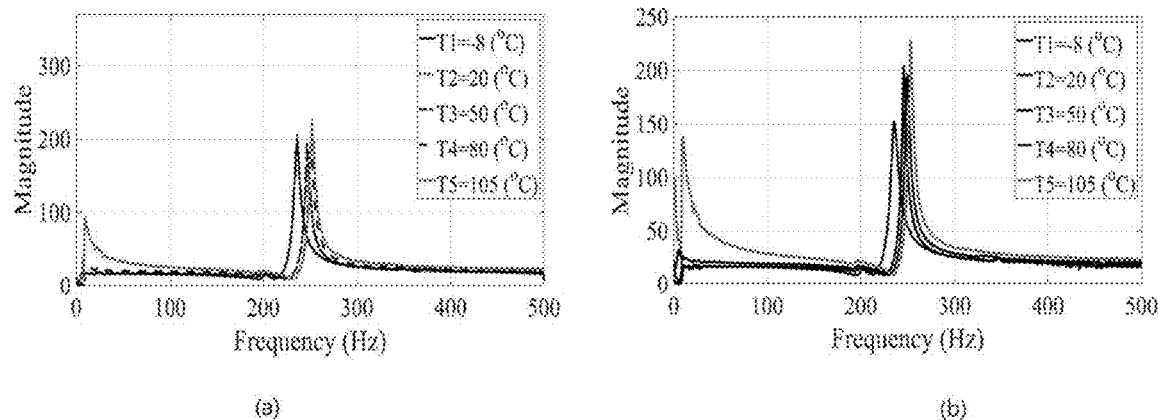
Measured frequency response functions with $\theta = 0°$: (a) $p =$ harmonic (b) $p =$ random.
[FIG. 6]
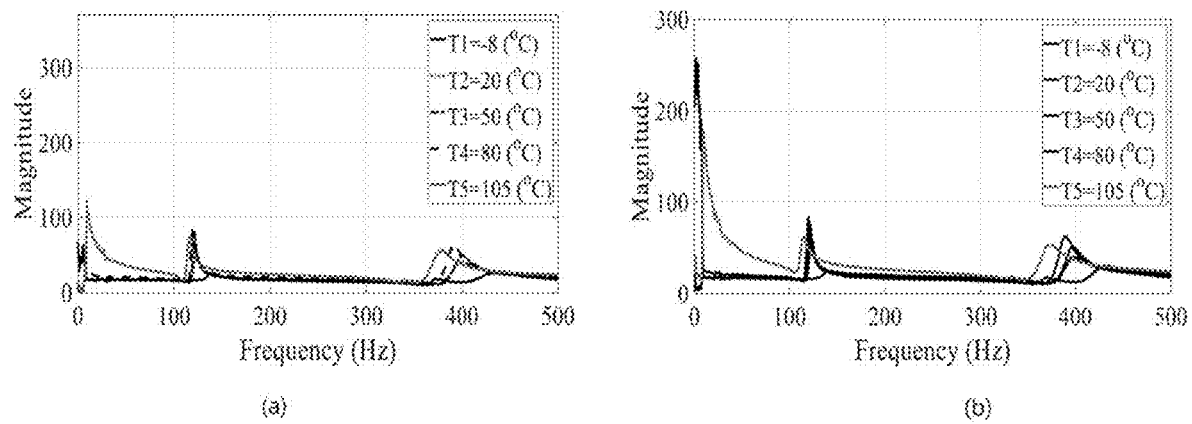
Measured frequency response functions with $\theta = 30°$: (a) $p =$ harmonic (b) $p =$ random.

[FIG. 7]
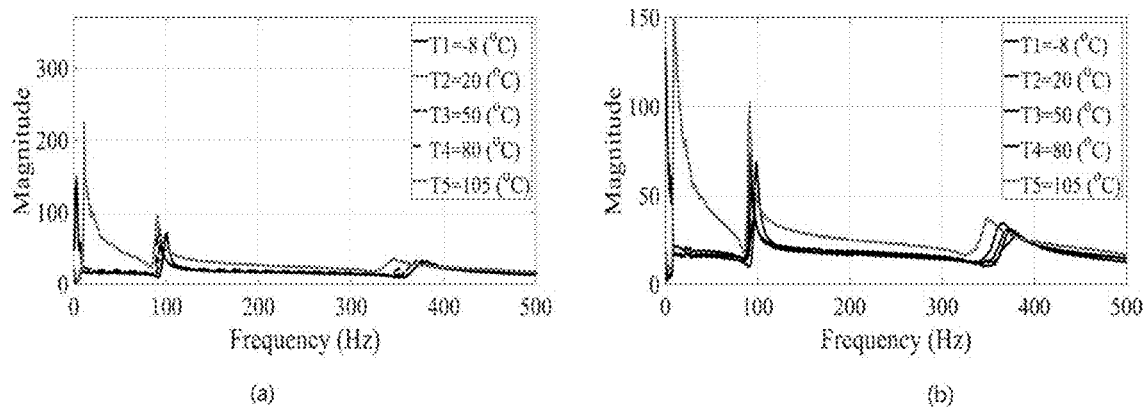
Measured frequency response functions with θ = 45°: (a) p = harmonic (b) p = random.
[FIG. 8]
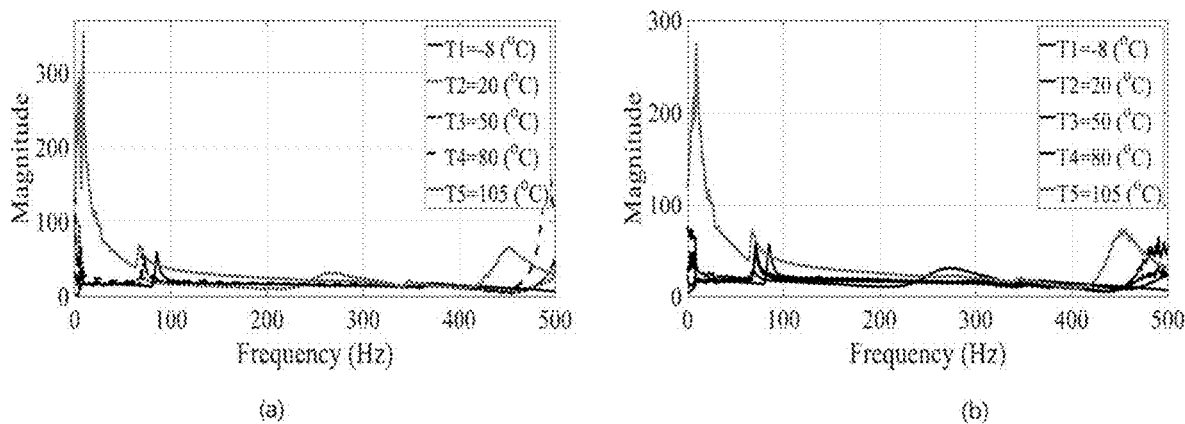
Measured frequency response functions with θ = 60°: (a) p = harmonic (b) p = random.

[FIG. 9]
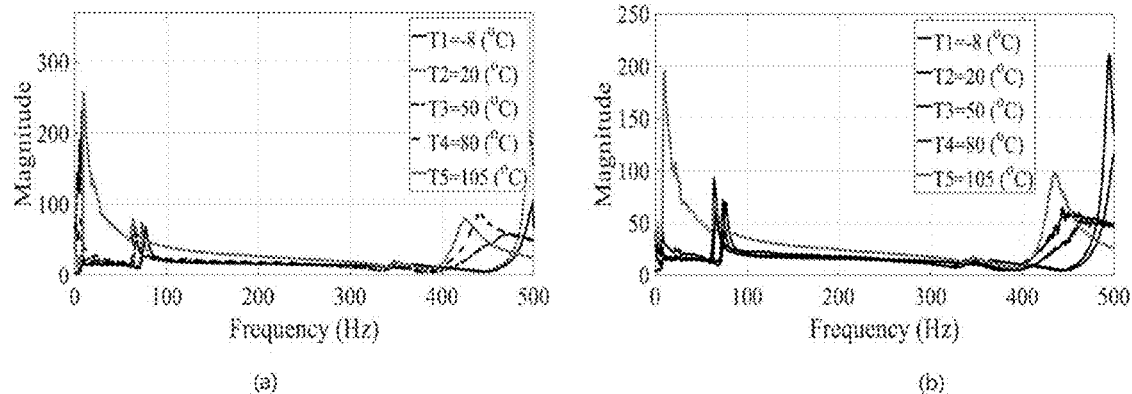
Measured frequency response functions with $\theta = 90°$; (a) $p = harmonic$ (b) $p = random$.
[FIG. 10]
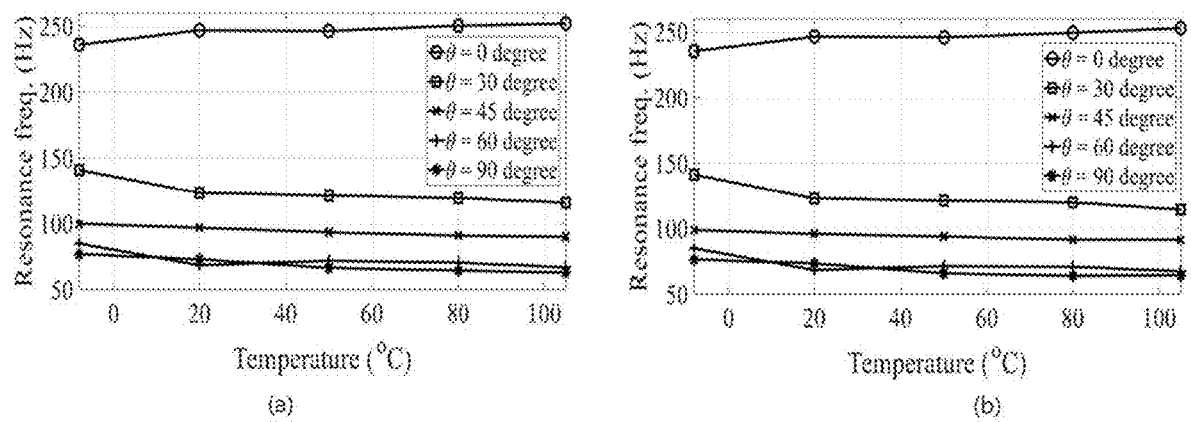
Variation of resonance frequency ($\omega_{n,1}$) according to different temperature conditions; (a) $p = harmonic$, (b) $p = random$.

[FIG. 11]
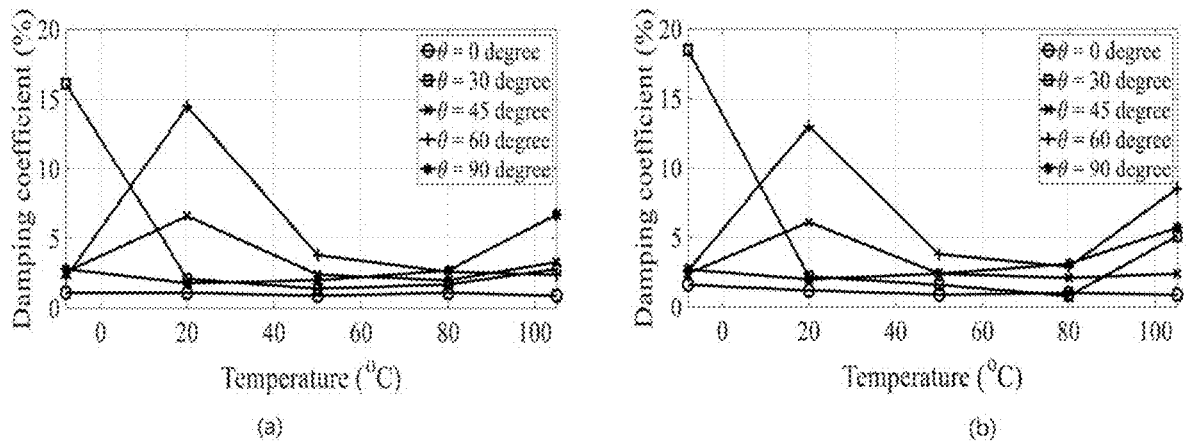
Variation of damping coefficient ($\zeta_1$) according to different temperature conditions; (a) $p$ = harmonic, (b) $p$ = random.
[FIG. 12]
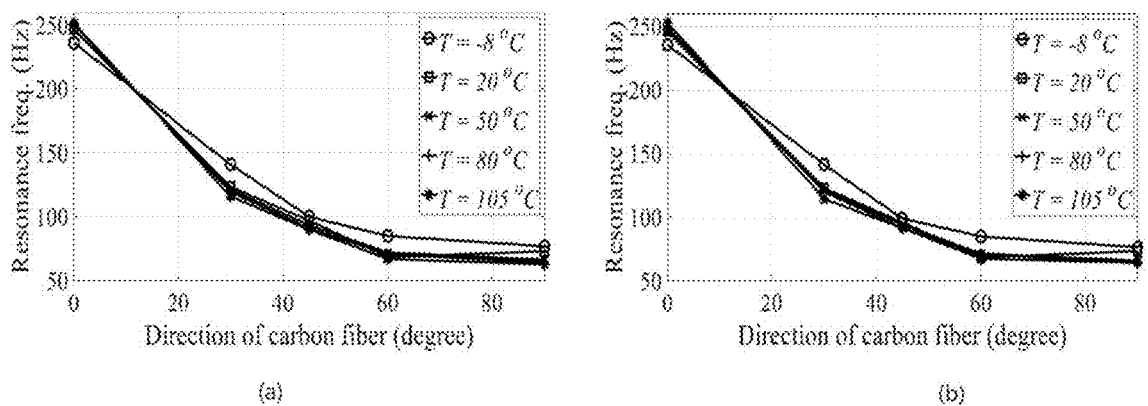
Variation of resonance frequency ($\omega_{n,1}$) according to different directions of carbon fiber; (a) $p$ = harmonic, (b) $p$ = random.

【FIG. 13】
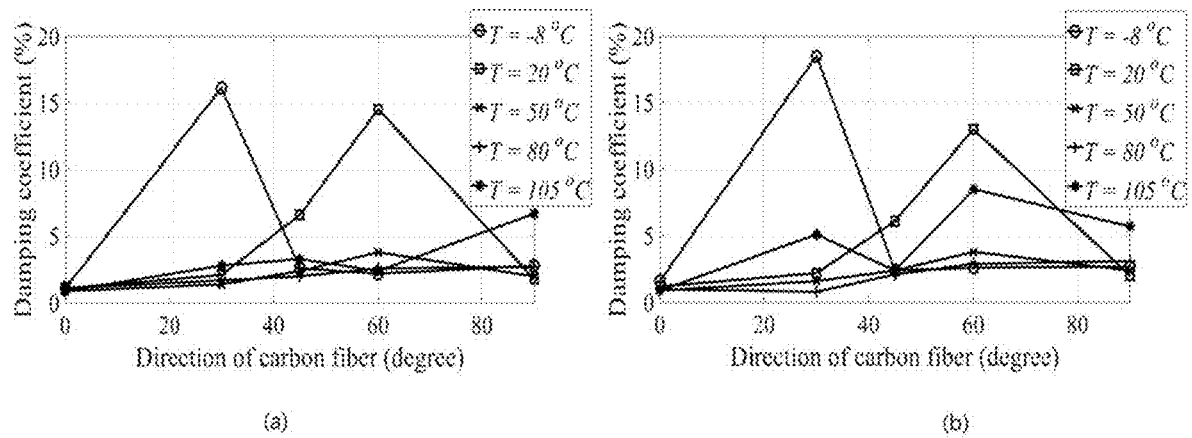
Variation of damping coefficient ($\xi_1$) according to different directions of carbon fiber; (a) $p$ = harmonic, (b) $p$ = random.
【FIG. 14】
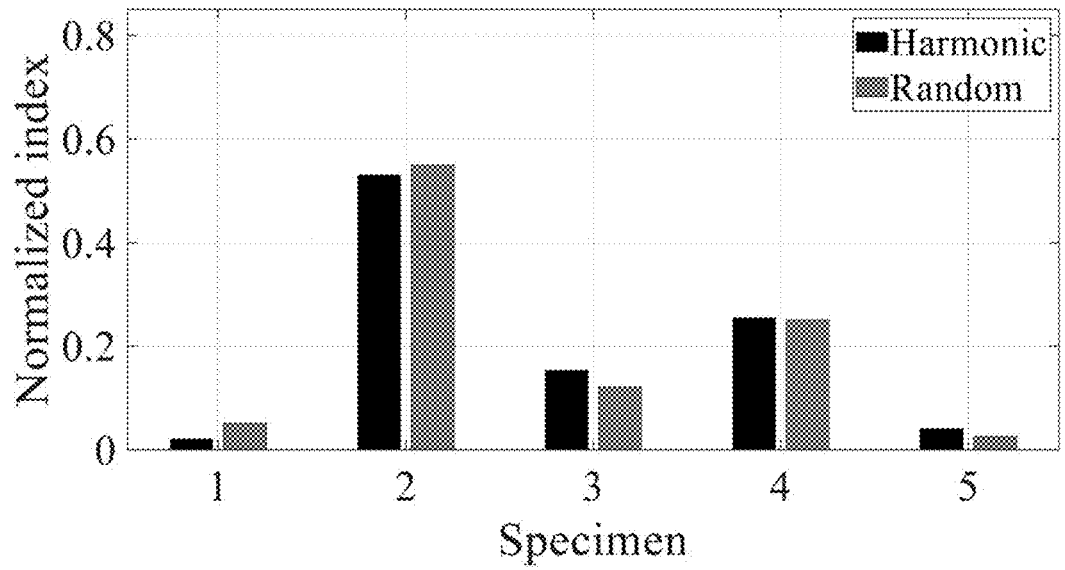
Normalized sensitivity index for the direction of carbon fiber for the two spectral loading cases.

【FIG. 15】
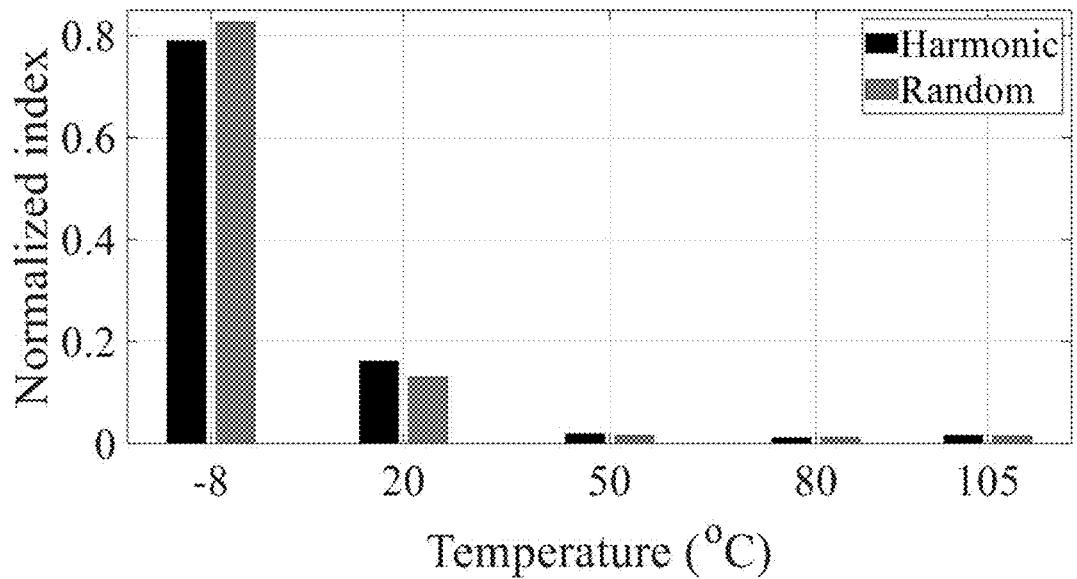
Normalized sensitivity index for the temperature for the two spectral loading cases.
【FIG. 16】
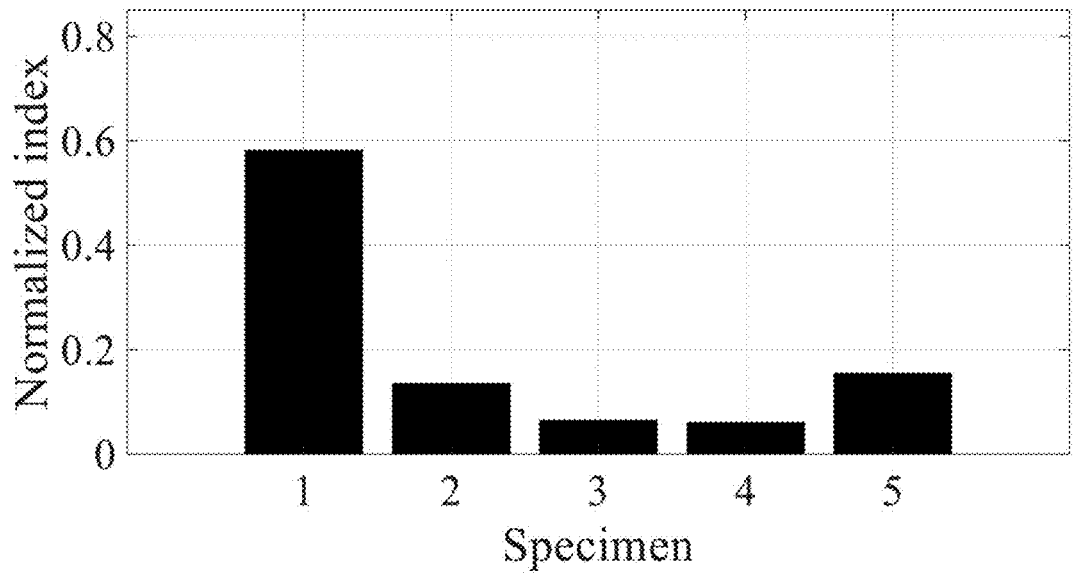
Normalized sensitivity indices for the spectral loading pattern.

[FIG. 17]
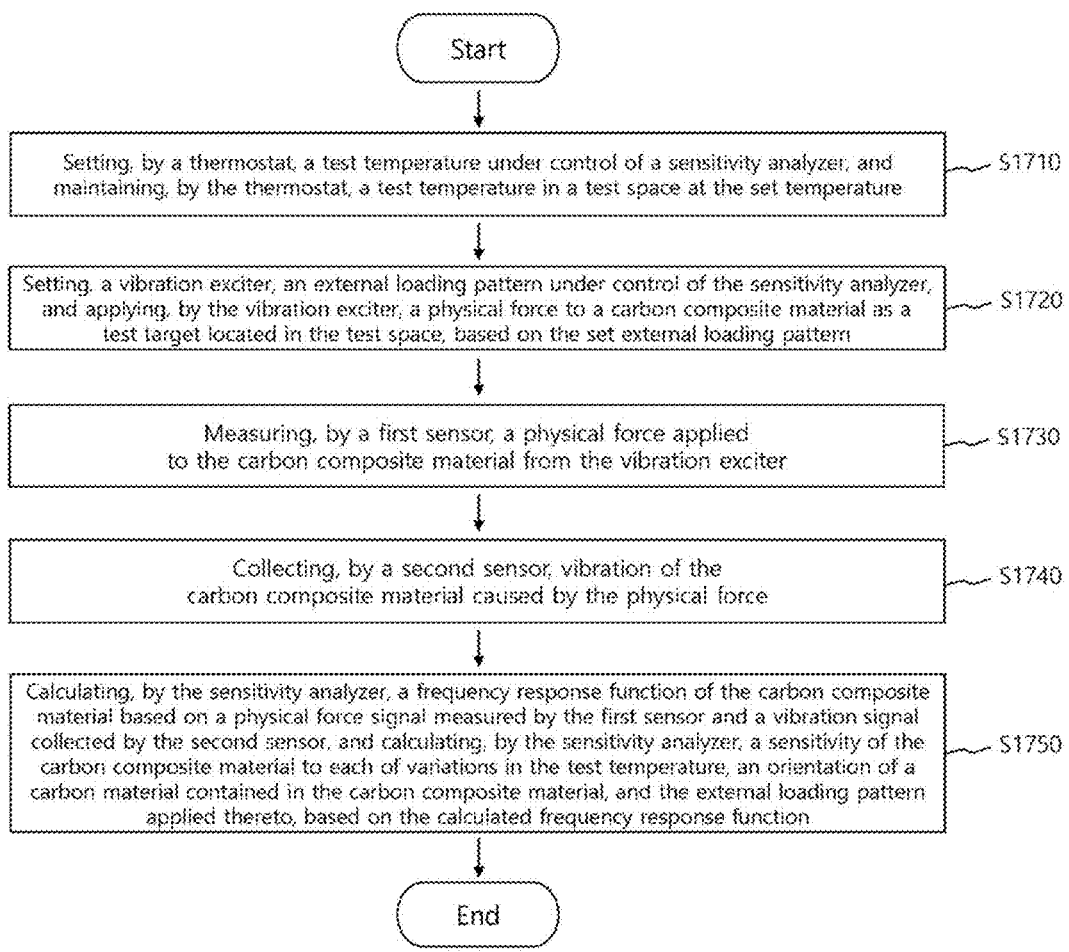

DEVICE FOR ANALYZING DYNAMIC CHARACTERISTICS OF CARBON COMPOSITE MATERIAL BASED ON TEST TEMPERATURE, ORIENTATION OF CARBON MATERIAL, AND EXTERNAL LOADING PATTERN APPLIED THERETO, AND DYNAMIC CHARACTERISTICS ANALYSIS METHOD USING THE SAME

CROSS-REFERENCE TO RELATED APPLICATION

This application claims a benefit under 35 U.S.C.§ 119(a) of Korean Patent Application No. 10-2020-0129803 filed on Oct. 8, 2020, on the Korean Intellectual Property Office, the entire disclosure of which is incorporated herein by reference for all purposes.

BACKGROUND

1. Field

The present disclosure relates to a device for analyzing dynamic characteristics of a test target material using frequency response and a method for analyzing dynamic characteristics using the same. More specifically, the present disclosure relates to a device for analyzing dynamic characteristics of a carbon composite material having an orientation in an internal structure, based on a test temperature, an orientation of a carbon material, and an external loading pattern applied thereto, and a method for analyzing dynamic characteristics thereof using the same.

2. Description of Related Art

A composite material refers to a combination of materials of different types and has characteristics that cannot be obtained from a single material. Unlike a single material, a composite material may have an irregular and non-continuous and multiphase microstructure. The composite material may include a particle reinforced material, a fiber reinforced material, and a structural composite material.

The composite material has physical or chemically reinforced characteristics compared to the single material. Light and durable composite material may be produced depending on types of materials constituting the same. For example, carbon fiber reinforced plastic (CFRP) is light and rigid, and is expected to be used in fields that require weight reduction of materials such as aerospace and automobile fields.

However, physical characteristics of the composite material are greatly affected by structures and types of materials constituting the same. When manufacturing a product using the composite material, a designer must use the composite material having physical characteristics that meet requirements of a final product, and must identify the physical characteristics of the composite material during a design process.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a device for analyzing dynamic characteristics of a carbon composite material having an orientation in an internal structure, based on a test temperature, an orientation of a carbon material, and an external loading pattern applied thereto, and a method for analyzing dynamic characteristics thereof using the same.

Further, a purpose of the present disclosure is to provide a device for analyzing dynamic characteristics of a carbon composite material, based on a test temperature, an orientation of a carbon material, and an external loading pattern applied thereto, and a method for analyzing dynamic characteristics thereof using the same, in which the device and the method may calculate a sensitivity of the carbon composite material, based on not only an orientation in an internal structure thereof, but also a temperature and a pattern of an external applied force thereof, and may accurately analyze physical characteristics of the carbon composite material based on the sensitivity.

Furthermore, a purpose of the present disclosure is to provide a device for analyzing dynamic characteristics of a carbon composite material, based on a test temperature, an orientation of a carbon material, and an external loading pattern applied thereto, and a method for analyzing dynamic characteristics thereof using the same, in which the device and the method may analyze physical characteristics of the carbon composite material based on a test temperature in an actual use environment, such that a product designer may predict performance of a product in the actual environment, based on the analysis result.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides a device for analyzing dynamic characteristics of a carbon composite material based on a test temperature, an orientation of a carbon material, and an external loading pattern applied thereto, the device comprising: a thermostat configured to set a test temperature under control of a sensitivity analyzer and to maintain a test temperature in a test space at the set temperature; a vibration exciter configured to set an external loading pattern under control of the sensitivity analyzer and to apply a physical force to a carbon composite material as a test target located in the test space, based on the set external loading pattern; a first sensor for measuring a physical force applied to the carbon composite material from the vibration exciter; a second sensor in contact with one side of the carbon composite material for collecting vibration of the carbon composite material caused by the physical force; and a sensitivity analyzer configured to: control the thermostat to set the test temperature in the test space, and control the vibration exciter to set the external loading pattern; calculate a frequency response function of the carbon composite material based on a physical force signal measured by the first sensor and a vibration signal collected by the second sensor; and calculate a sensitivity of the carbon composite material to each of variations in the test temperature, an orientation of a carbon material contained in the carbon composite material, and the external loading pattern applied thereto, based on the calculated frequency response function.

In one implementation of the device, the carbon composite material as the test target includes carbon fiber reinforced plastic (CFRP) containing a carbon fiber having a single orientation at a specific angle, wherein the orientation of the carbon material includes an orientation of the carbon fiber.

In one implementation of the device, the vibration exciter applies the physical force based on at least two external loading patterns, wherein the at least two external loading patterns include a random pattern and a harmonic pattern.

In one implementation of the device, the first sensor includes a load sensor positioned between the vibration exciter and the carbon composite material to measure the physical force.

In one implementation of the device, the second sensor includes an acceleration sensor, wherein the second sensor includes a plurality of second sensors to collect vibrations at a plurality of positions on the carbon composite material.

In one implementation of the device, a modal damping coefficient of the frequency response function is based on the test temperature, the external loading pattern, and the orientation of the carbon material, wherein a resonance frequency of the frequency response function is based on the test temperature and the orientation of the carbon material.

In one implementation of the device, the sensitivity analyzer is further configured to calculate the frequency response function based on an average value of values respectively measured by the plurality of second sensors and based on a value measured by the first sensor.

In one implementation of the device, the sensitivity analyzer is further configured to calculate the frequency response function using a following Equation 1:

$$H(\omega, \theta, T, p) = \sum_{i=1}^{N} \frac{r_i^e}{(\omega_{n,i}(\theta, T))^2 - \omega^2 + 2\omega_{n,i}(\theta, T)\omega\xi_i(\theta, T, p)j} \quad \text{[Equation 1]}$$

wherein a resonance frequency at an i-th mode is defined as $\omega_{n,i}$, $\omega$ denotes an angular frequency of $2\pi f$, f denotes a frequency, and $r_i^e$ denotes a residual, $\zeta_i$ denotes a damping coefficient at the i-th mode, wherein $\theta$ denotes the orientation of the carbon material contained in the carbon composite material, T denotes the test temperature, and p denotes the external loading pattern or a frequency spectrum pattern applied to the carbon composite material from the vibration exciter.

In one implementation of the device, the sensitivity analyzer is further configured to calculate a sensitivity function of the carbon composite material to the orientation of the carbon material using a following Equation 2:

$$\frac{\partial H(\omega, \theta, T, p)}{\partial \theta} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T)\frac{\partial \omega_{n,i}(\theta, T)}{\partial \theta} + \left(\omega\xi_i(\theta, T, p)\frac{\partial \omega_{n,i}(\theta, T)}{\partial \theta} + \omega_{n,i}(\theta, T)\omega\frac{\partial \xi_i(\theta, T, p)}{\partial \theta}\right)j \right\} \quad \text{[Equation 2]}$$

In one implementation of the device, the sensitivity analyzer is further configured to calculate a sensitivity index of the carbon composite material to the orientation of the carbon material using a following Equation 3, and to calculate a normalized sensitivity index to the orientation of the carbon material using a following Equation 4:

[Equation 3]

$$I_{\theta,i,k} = \left| \omega_{n,i}(\theta_k, T)\frac{\partial \omega_{n,i}(\theta_k, T)}{\partial \theta} + \left(\omega\xi_i(\theta_k, T, p)\frac{\partial \omega_{n,i}(\theta_k, T)}{\partial \theta} + \omega_{n,i}(\theta_k, T)\omega\frac{\partial \xi_i(\theta_k, T, p)}{\partial \theta}\right)j \right| \quad \text{[Equation 3]}$$

wherein $I_{\theta,i,k}$ denotes a sensitivity index of a k-th test target at the i-th mode to the orientation $\theta$ of the carbon material, $$\bar{I}_{\theta,i} = \frac{I_{\theta,i,k}}{\sum_k I_{\theta,i,k}} \quad \text{[Equation 4]}$$

wherein $\bar{I}_{\theta,i}$ denotes the normalized sensitivity index to the orientation $\theta$ of the carbon material.

In one implementation of the device, the sensitivity analyzer is further configured to calculate a sensitivity function of the carbon composite material to the test temperature using a following Equation 5:

$$\frac{\partial H(\omega, \theta, T, p)}{\partial T} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T)\frac{\partial \omega_{n,i}(\theta, T)}{\partial T} + \left(\omega\xi_i(\theta, T, p)\frac{\partial \omega_{n,i}(\theta, T)}{\partial T} + \omega_{n,i}(\theta, T)\omega\frac{\partial \xi_i(\theta, T, p)}{\partial T}\right)j \right\}. \quad \text{[Equation 5]}$$

In one implementation of the device, the sensitivity analyzer is further configured to calculate a sensitivity index to the test temperature using a following Equation 6, and calculate a normalized sensitivity index to the test temperature using a following Equation 7:

$$I_{T,i,k} = \left| \omega_{n,i}(\theta, T_k)\frac{\partial \omega_{n,i}(\theta, T_k)}{\partial T} + \left(\omega\xi_i(\theta, T_k, p)\frac{\partial \omega_{n,i}(\theta, T_k)}{\partial T} + \omega_{n,i}(\theta, T_k)\omega\frac{\partial \xi_i(\theta, T_k, p)}{\partial T}\right)j \right| \quad \text{[Equation 6]}$$

wherein $I_{T,i,k}$ denotes a sensitivity index of a k-th test target at the i-th mode to the test temperature T, $$\bar{I}_{T,i} = \frac{I_{T,i,k}}{\sum_k I_{T,i,k}} \quad \text{[Equation 7]}$$

wherein $I_{T,i}$ denotes the normalized sensitivity index to the test temperature T.

In one implementation of the device, the sensitivity analyzer is further configured to calculate a sensitivity function of the carbon composite material to the external loading pattern using a following Equation 8:

$$\frac{\partial H(\omega, \theta, T, p)}{\partial p} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T)\omega \frac{\partial \xi_i(\theta, T, p)}{\partial p} j \right\}. \quad \text{[Equation 8]}$$

In one implementation of the device, the sensitivity analyzer is further configured to calculates a sensitivity index of the carbon composite material to the external loading pattern using a following Equation 9, and calculate a normalized sensitivity index to the external loading pattern using a following Equation 10:

$$I_{p,i,k} = \left| \omega_{n,i}(\theta, T)\omega \frac{\partial \xi_i(\theta, T, p_k)}{\partial p} j \right| \quad \text{[Equation 9]}$$

wherein $I_{p,I,k}$ denotes a sensitivity index of a k-th test target at the i-th mode to the external loading pattern p, $$\bar{I}_{p,i} = \frac{I_{p,i,k}}{\sum_{k} I_{p,i,k}} \quad \text{[Equation 10]}$$

wherein $\bar{I}_{p,i}$ denotes the normalized sensitivity index to the external loading pattern p.

Another aspect of the present disclosure provides a method for analyzing dynamic characteristics of a carbon composite material based on a test temperature, an orientation of a carbon material, and an external loading pattern applied thereto, the method comprising: setting, by a thermostat, a test temperature under control of a sensitivity analyzer, and maintaining, by the thermostat, a test temperature in a test space at the set temperature; setting, a vibration exciter, an external loading pattern under control of the sensitivity analyzer, and applying, by the vibration exciter, a physical force to a carbon composite material as a test target located in the test space, based on the set external loading pattern; measuring, by a first sensor, a physical force applied to the carbon composite material from the vibration exciter; collecting, by a second sensor, vibration of the carbon composite material caused by the physical force; calculating, by the sensitivity analyzer, a frequency response function of the carbon composite material based on a physical force signal measured by the first sensor and a vibration signal collected by the second sensor; and calculating, by the sensitivity analyzer, a sensitivity of the carbon composite material to each of variations in the test temperature, an orientation of a carbon material contained in the carbon composite material, and the external loading pattern applied thereto, based on the calculated frequency response function.

In one implementation of the method, a modal damping coefficient of the frequency response function is based on the test temperature, the external loading pattern, and the orientation of the carbon material, wherein a resonance frequency of the frequency response function is based on the test temperature and the orientation of the carbon material.

In one implementation of the method, calculating the frequency response function includes calculating the frequency response function using a following Equation 1:

$$H(\omega, \theta, T, p) = \sum_{i=1}^{N} \frac{r_i^e}{(\omega_{n,i}(\theta, T))^2 - \omega^2 + 2\omega_{n,i}(\theta, T)\omega\xi_i(\theta, T, p)j} \quad \text{[Equation 1]}$$

wherein a resonance frequency at an i-th mode is defined as $\omega_{n,i}$, $\omega$ denotes an angular frequency of $2\pi f$, f denotes a frequency, and $r_i^c$ denotes a residual, $\zeta_i$ denotes a damping coefficient at the i-th mode, wherein $\theta$ denotes the orientation of the carbon material contained in the carbon composite material, T denotes the test temperature, and p denotes the external loading pattern or a frequency spectrum pattern applied to the carbon composite material from the vibration exciter.

In one implementation of the method, calculating the sensitivity includes calculating a sensitivity function of the carbon composite material to the orientation of the carbon material using a following Equation 2:

$$\frac{\partial H(\omega, \theta, T, p)}{\partial \theta} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T) \frac{\partial \omega_{n,i}(\theta, T)}{\partial \theta} + \left( \omega\xi_i(\theta, T, p) \frac{\partial \omega_{n,i}(\theta, T)}{\partial \theta} + \omega_{n,i}(\theta, T)\omega \frac{\partial \xi_i(\theta, T, p)}{\partial \theta} \right) j \right\}. \quad \text{[Equation 2]}$$

In one implementation of the method, calculating the sensitivity includes calculating a sensitivity function of the carbon composite material to the test temperature using a following Equation 5:

$$\frac{\partial H(\omega, \theta, T, p)}{\partial T} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T) \frac{\partial \omega_{n,i}(\theta, T)}{\partial T} + \left( \omega\xi_i(\theta, T, p) \frac{\partial \omega_{n,i}(\theta, T)}{\partial T} + \omega_{n,i}(\theta, T)\omega \frac{\partial \xi_i(\theta, T, p)}{\partial T} \right) j \right\}. \quad \text{[Equation 5]}$$

In one implementation of the method, calculating the sensitivity includes calculating a sensitivity function of the carbon composite material to the external loading pattern using a following Equation 8:

$$\frac{\partial H(\omega, \theta, T, p)}{\partial p} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{\omega_{n,i}(\theta, T)\omega \frac{\partial \xi_i(\theta, T, p)}{\partial p} j\right\}. \quad [\text{Equation 8}]$$

According to the present disclosure, the device for analyzing the dynamic characteristics of the carbon composite material based on the test temperature, the orientation of the carbon material, and the external loading pattern applied thereto, and the method for analyzing the dynamic characteristics using the same may be realized.

According to the present disclosure, the device for analyzing the dynamic characteristics of the carbon composite material based on the test temperature, the orientation of the carbon material, and the external loading pattern applied thereto, and the dynamic characteristics analysis method using the same may calculate and provide the sensitivity of the carbon composite material based on not only the orientation in the internal structure, but also the test temperature and the pattern of the externally applied force, and thus more accurately analyze the physical characteristics of the material, based on the sensitivity.

According to the present disclosure, the device for analyzing the dynamic characteristics of the carbon composite material based on the test temperature, the orientation of the carbon material, and the external loading pattern applied thereto, and the dynamic characteristics analysis method using the same may analyze the physical characteristics of the carbon composite material based on the test temperature in the actual use environment, such that a product designer who manufactures a product using the carbon composite material may predict performance of the product in the actual use environment, based on the analysis result.

In addition to the effects as described above, specific effects of the present disclosure will be described together with the detailed description for carrying out the disclosure.

BRIEF DESCRIPTION OF DRAWINGS

FIG. 1 is a configuration diagram showing a configuration of a device for analyzing dynamic characteristics of a carbon composite material based on a test temperature, an orientation of a carbon material, and an external loading pattern applied thereto according to an embodiment of the present disclosure.

FIG. 2 is a configuration diagram showing a configuration of a device for analyzing dynamic characteristics, the device including a plurality of sensors.

FIG. 3A and FIG. 3B schematically show a test target carbon composite material

FIG. 5 is graphs of a frequency response function based on a test temperature of a carbon composite material, and an external loading pattern type applied thereto when a carbon fiber orientation is 0°.

FIG. 6 is graphs of a frequency response function based on a test temperature of a carbon composite material, and an external loading pattern type applied thereto when a carbon fiber orientation is 30°.

FIG. 7 is graphs of a frequency response function based on a test temperature of a carbon composite material, and an external loading pattern type applied thereto when a carbon fiber orientation is 45°.

FIG. 8 is graphs of a frequency response function based on a test temperature of a carbon composite material, and an external loading pattern type applied thereto when a carbon fiber orientation is 60°.

FIG. 9 is graphs of a frequency response function based on a test temperature of a carbon composite material, and an external loading pattern type applied thereto when a carbon fiber orientation is 90°.

FIG. 10 is are graphs of a resonance frequency $\omega_{n,l}$ based on a test temperature variation of a carbon composite material.

FIG. 11 is are graphs of a damping coefficient $\zeta l$ based on a test temperature variation of a carbon composite material.

FIG. 12 is graphs of a resonance frequency $\omega_{n,l}$ based on a variation in an orientation of a carbon fiber.

FIG. 13 is graphs of a damping coefficient $\zeta l$ based on a variation of an orientation of a carbon fiber.

FIG. 14 is a graph of a normalized sensitivity index of a carbon composite material to an orientation of a carbon fiber for two external loading patterns.

FIG. 15 is a graph of the normalized sensitivity index of a carbon composite material to a test temperature for two external loading patterns.

FIG. 16 is a graph of a normalized sensitivity index of a carbon composite material to an external loading pattern.

FIG. 17 is a flowchart illustrating a method for analyzing dynamic characteristics of a carbon composite material based on a test temperature, an orientation of a carbon material, and an external loading pattern applied thereto, according to an embodiment of the present disclosure.

DETAILED DESCRIPTIONS

Figure 4A:
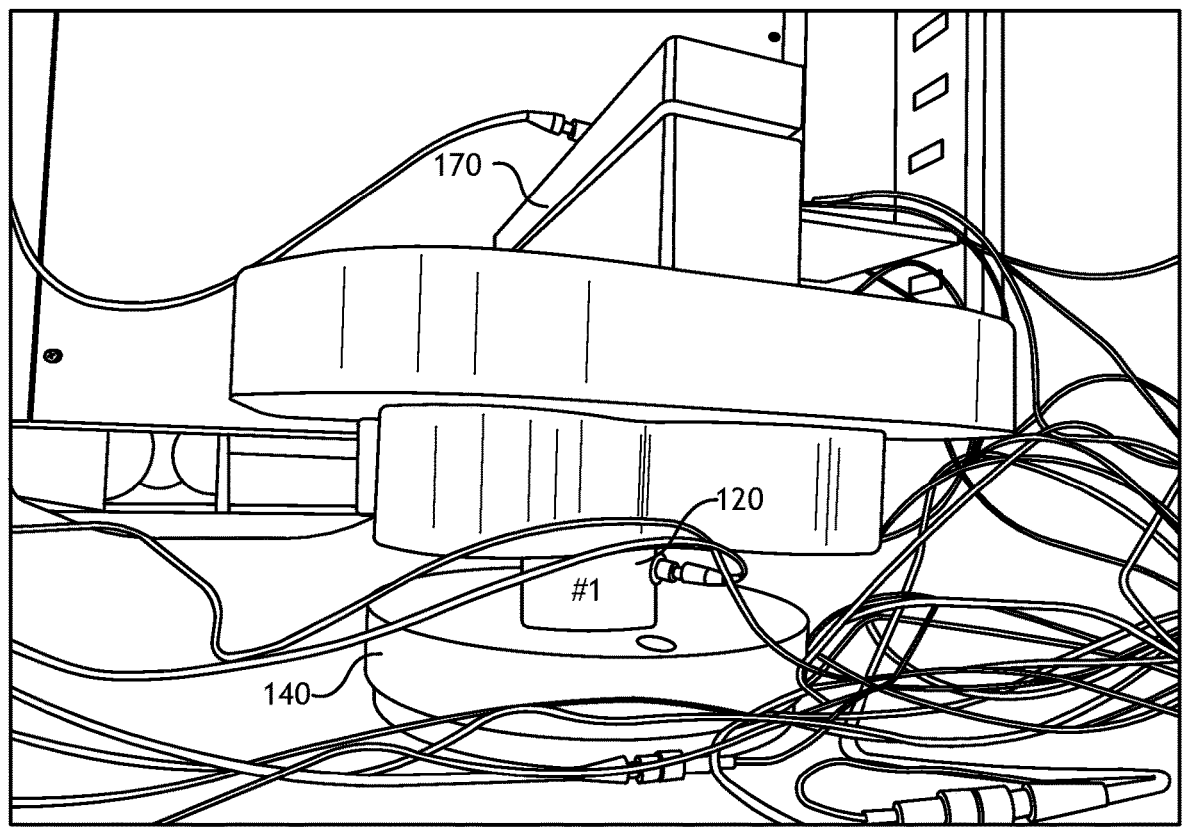
FIG. 4A and FIG. 4B are diagrams showing an example of configuring the device for analyzing the dynamic characteristics for an experiment.

For simplicity and clarity of illustration, elements in the figures are not necessarily drawn to scale. The same reference numbers in different figures denote the same or similar elements, and as such perform similar functionality. Moreover, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a device for analyzing dynamic characteristics of a carbon composite material based on a test temperature, an orientation of a carbon material, and an external loading pattern applied thereto according to the present disclosure and a method for analyzing the dynamic characteristics using the device will be described below.

FIG. 1 is a configuration diagram showing a configuration of a device for analyzing dynamic characteristics of a carbon composite material based on a test temperature, an orientation of a carbon material, and an external loading pattern applied thereto according to an embodiment of the present disclosure.

Referring to FIG. 1, a device 100 for analyzing dynamic characteristics of a carbon composite material based on a test temperature, an orientation of a carbon material, and an external loading pattern applied thereto may include a first sensor 120, a second sensor 130, a vibration exciter 140, a sensitivity analyzer 150 and a thermostat 160.

The device 100 for analyzing dynamic characteristics sets a temperature and an external loading pattern based on a user's control, and calculates a frequency response function of a test target object 110 under the set test conditions. In one embodiment, the test target object 110 may be a carbon fiber reinforced plastic (CFRP) in which carbon fibers have an orientation at a specific angle.

The device 100 for analyzing dynamic characteristics calculates a sensitivity index of the test target object 110 to variations in an orientation of a material contained in the test target object, a temperature, and an external loading pattern applied thereto based on the calculated frequency response function. The user may perform the test on test target objects having different orientations of the material while changing conditions of the test temperature and the external loading pattern. The device 100 for analyzing dynamic characteristics may calculate the sensitivity index of the test target object under each test condition, and the user may compare the calculated sensitivity indexes of various types of test target objects with each other and then infer the physical characteristics thereof based on the comparison results.

The test target object 110 may refer to a target object whose physical characteristics are to be analyzed. The test target object 110 may be a specimen of a portion of a material to be tested, or may be a part made of a test material. In one embodiment, the test target object 110 may be an object made of a material having an orientation at a specific angle, for example, a composite material.

For example, the test target object 110 may include a carbon fiber reinforced plastic (CFRP) containing carbon fibers as a reinforcing material. The physical characteristics and mechanical properties of the carbon fiber reinforced plastic may be affected by conditions of the carbon fiber and a polymer resin that constitute the same, and a layered structure of the carbon fibers in the CFRP. In particular, since the orientation of the carbon fiber as a reinforcing material plays a large role in determining the physical characteristics of the carbon fiber reinforced plastic, the carbon fiber reinforced plastic must be designed in consideration of a principle direction of an external force.

Hereinafter, for convenience of descriptions, it is assumed that a specimen of the carbon composite material, for example, the carbon fiber reinforced plastic is used as the test target object 110.

In one embodiment, the carbon composite material 110 may be fixed to a test position using a jig. The carbon composite material 110 may be placed to the test position using an automatic transfer device (not shown), or may be manually placed to the test position by the user.

The first sensor 120 contacts one side of the carbon composite material 110 and measures a physical force applied to the carbon composite material 110 from the vibration exciter 140. The first sensor 120 transmits the measured value to the sensitivity analyzer 150. In one embodiment, the first sensor 120 may be positioned between the vibration exciter 140 and the carbon composite material 110 to measure a physical force applied to the carbon composite material 110 from the vibration exciter 140. In one embodiment, the first sensor 120 may be positioned to be in contact with the vibration exciter 140, and the carbon composite material 110 may be positioned to be in contact with the first sensor 120. The first sensor 120 includes a load sensor.

The second sensor 130 contacts the other side of the carbon composite material 110 and collects vibration of the carbon composite material 110 caused by the physical force. In one embodiment, the second sensor may include an acceleration sensor that measures a acceleration displacement of the carbon composite material 110. In another embodiment, the second sensor may include a displacement sensor for measuring a positional displacement of the carbon composite material 110 or a velocity sensor for measuring a velocity displacement thereof.

A slight variation in the measurement value collected by the second sensor may occur depending on a vibration collection location. When using values measured at a plurality of positions using a plurality of sensors, more accurate measurement may be performed. In an embodiment, when placing a plurality of second sensors 130 at a plurality of positions on the other side of the carbon composite material 110, vibration may be collected from each of the second sensors 130.

FIG. 2 is a schematic diagram showing a configuration of a device for analyzing dynamic characteristics including a plurality of sensors.

Referring to FIG. 2, a device 200 for analyzing dynamic characteristics of a carbon composite material based on a test temperature, an orientation of a carbon material, and an external loading pattern applied thereto may include a first sensor 120, a second sensor 130, a vibration exciter 140, a sensitivity analyzer 150, a thermostat 160 and a jig 170.

The carbon composite material 110 may be fixedly disposed at a test position using the jig 170. A plurality of second sensors 130a, 130b, 130c, 130d, . . . may be placed on one side of the carbon composite material 110.

A configuration of the device 200 may be the same as that of the device 100 of FIG. 1 except for the jig 170 for fixing the carbon composite material 110 and the plurality of second sensors 130a, 130b, 130c, 130d, . . . for collecting the vibrations of the carbon composite material 110. The number and locations of the second sensors may vary depending on implementations.

The plurality of second sensors 130a, 130b, 130c, 130d, . . . may be placed at preset locations or locations set by the user. Each of the plurality of second sensors 130a, 130b, 130c, 130d, . . . may collect the vibration of the carbon composite material 110 at a corresponding position and transmit the collected vibration to the sensitivity analyzer 150.

FIG. 3A and FIG. 3B are schematic diagrams of a test target carbon composite material.

In the carbon composite material, the carbon fiber has one orientation. The physical characteristics of the carbon composite material, for example, a strength, etc. thereof may vary based on the orientation of the carbon fiber.

Referring to FIG. 3A, it is assumed that the test target carbon composite material has a length L, a width W, and a thickness H, and an orientation of a carbon material, that is, a carbon fiber relative to a length L direction is defined as θ. For example, it is assumed that the carbon fiber is oriented an angle of θ relative to a length direction of the carbon composite material.

FIG. 3B is a diagram showing an clamped zone in which the carbon composite material is clamped to the jig 170 in an embodiment of FIG. 2.

Referring back to FIG. 1, the vibration exciter 140 sets the external loading pattern under the control of the sensitivity analyzer 150, and applies a physical force to one side of the carbon composite material 110 based on the set external loading pattern. In one embodiment, the vibration exciter 140 may apply a physical force having different external loading patterns to the carbon composite material 110. The vibration exciter 110 may include a single-axial vibration exciter that applies a force in one axial direction, a two-axial vibration exciter that applies a force in two-axial directions, a three-axial vibration exciter that applies a force in three-axial directions, and the like. Hereinafter, for convenience of descriptions, it is assumed that the single-axial vibration exciter is used as the vibration exciter 140. For example, the vibration exciter 140 may include an electrodynamic shaker or actuator that vibrates the carbon composite material 110 by applying a force in one axial direction.

The vibration exciter 140 applies a physical force having at least two external loading patterns to the carbon composite material 110 under the control of the sensitivity analyzer 150. In one embodiment, the external loading pattern includes a random pattern and a harmonic pattern.

The vibration exciter 140 may apply a physical force having an external loading pattern in a preset frequency band to the carbon composite material 110. The random pattern may include a plurality of random frequency signals, while the harmonic pattern may include a sinusoidal signal of a fundamental frequency.

In another embodiment, a fixed impact device, for example, an impact hammer capable of applying an impact to the carbon composite material 110 may be used as the vibration exciter 140. When using the impact hammer, a tip may be formed at a portion to which the impact is actually applied.

Hereinafter, for convenience of descriptions, it is assumed that an electrodynamic shaker is used as the vibration exciter 140. The electrodynamic shaker vibrator may precisely control an external loading frequency and an external loading pattern, thereby to achieve reliably results at repeated tests.

The sensitivity analyzer 150 controls the thermostat 160 to set the test temperature in the test space, and controls the vibration exciter 140 to set the external loading pattern. The thermostat 160 sets the test temperature under the control of the sensitivity analyzer 150 and maintains the test temperature in the test space at a set temperature.

The sensitivity analyzer 150 converts a physical force signal measured by the first sensor 120 and a vibration signal collected by the second sensor 130 based on the set temperature and the set external loading pattern into a frequency domain signal. Then, the sensitivity analyzer 150 calculates a frequency response function of the carbon composite material 110 based on the frequency domain signal. The sensitivity analyzer 150 calculates the sensitivity of the carbon composite material to the variations of the orientation θ of the carbon material contained in the carbon composite material of the carbon composite material 110, the test environment temperature and the external loading pattern applied thereto, based on the frequency response function. When assuming that the carbon composite material 110 has a linear system, an analysis method using the frequency response function is one of the efficient methods for analyzing the physical characteristics of the carbon composite material.

Hereinafter, a process in which the sensitivity analyzer 150 calculates the frequency response function (FRF) based on the variation of the orientation θ of the carbon material, the test temperature, and the external loading pattern and calculates the sensitivity based on the FRF will be described in detail.

When the physical force applied to the carbon composite material 110 is defined as F(ω) and the vibration of the carbon composite material 110 caused by the physical force is defined as R(ω), a frequency response function of an i-th mode may be expressed as a following Equation 1:

$$\frac{R(\omega)}{F(\omega)} = \frac{R_i^e}{-M_i\omega^2 + C_i\omega j + K_i} \quad \text{[Equation 1]}$$

where F(ω) denotes a frequency conversion value of an external physical force signal, R(ω) denotes a frequency conversion value of the vibration signal caused by the physical force, ω denotes an angular frequency (2πf, f being a frequency), $R_i^e$ denotes a residual, and $M_i$ denotes a mass of the test target object, $C_i$ denotes a damping coefficient, and $K_i$ denotes a stiffness coefficient.

When assuming that a resonance frequency at the i-th mode is defined as $\omega_{n,i}$, ($=\sqrt{K_i/M_i}$), and two half-power points are defined as $\omega_{n,i}^{(1)}$ and $\omega_{n,i}^{(2)}$ respectively, the damping coefficient may be expressed as a following Equation 2:

$$\xi_i = \frac{|\omega_{n,i}^{(2)} - \omega_{n,i}^{(1)}|}{\omega_{n,i}} \quad \text{[Equation 2]}$$

where ζi represents the damping coefficient at the i-th mode.

When the frequency response function is represented using the resonance frequency and the damping coefficient, the frequency response function of the above Equation 1 may be expressed as a follows Equation 3:

$$H(\omega) = \frac{r_i^e}{(\omega_{n,i})^2 - \omega^2 + 2\omega_{n,i}\omega\xi_i j} \quad \text{[Equation 3]}$$

where H(ω) denotes the frequency response function, and $r_i^e$ denotes a residual.

It has been experimentally verified that the resonance frequency $\omega_{n,i}$ and the damping coefficient ζi are affected by the orientation θ of the carbon material, and the test temperature and the damping coefficient ζi is affected by the orientation θ of the carbon material, and the external loading pattern applied thereto applied thereto.

Therefore, the frequency response function based on the test temperature, the orientation θ of the carbon material and the external loading pattern applied thereto may be expressed as a following Equation 4. The sensitivity analyzer 150 may calculate the frequency response function based on the test temperature T, the external loading pattern p, and the orientation θ of the carbon material using the following Equation 4:

$$H(\omega, \theta, T, p) = \sum_{i=1}^{N} \frac{r_i^e}{(\omega_{n,i}(\theta, T))^2 - \omega^2 + 2\omega_{n,i}(\theta, T)\omega\xi_i(\theta, T, p)j} \quad \text{[Equation 4]}$$

where θ denotes the orientation of the carbon material contained in the test target carbon composite material, T denotes the test temperature, and p denotes the external loading pattern (or a frequency spectrum pattern) applied to the test target carbon composite material from the vibration exciter.

In one embodiment, when the vibration of the test target carbon composite material is collected using a plurality of second sensors, the sensitivity analyzer 150 may calculate a representative frequency response function of the test target carbon composite material using an average value of values measured by the plurality of second sensors and a value measured by the first sensor.

In another embodiment, the sensitivity analyzer 150 may calculate a plurality of frequency response functions corresponding to the values measured by the second sensors, based on the values measured by the plurality of second sensors and the values measured by the first sensor, and then may calculate an average value of the plurality of frequency response functions as a representative frequency response function of the test target carbon composite material.

The sensitivity analyzer 150 calculates a sensitivity function to the orientation θ of the carbon material using the Equation 4. The sensitivity function is related to dynamic characteristics as the physical characteristics of the test target object. The sensitivity function to the orientation of the carbon material may be obtained as a partial derivative of the frequency response function using the orientation θ as a variable, as shown in a following Equation 5:

[Equation 5]

$$\frac{\partial H(\omega, \theta, T, p)}{\partial \theta} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2}$$

$$\left\{ \omega_{n,i}(\theta, T)\frac{\partial \omega_{n,i}(\theta, T)}{\partial \theta} + \left( \omega\xi_i(\theta, T, p)\frac{\partial \omega_{n,i}(\theta, T)}{\partial \theta} + \omega_{n,i}(\theta, T)\omega\frac{\partial \xi_i(\theta, T, p)}{\partial \theta} \right)j \right\}$$

The sensitivity analyzer 150 calculates the sensitivity function to the test temperature T of the carbon material using the Equation 4. The sensitivity function to the orientation of the carbon material may be obtained as a partial derivative of the frequency response function using the test temperature T as a variable as in a following Equation 6:

$$\frac{\partial H(\omega, \theta, T, p)}{\partial T} = \qquad \text{[Equation 6]}$$

$$\sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2}$$

$$\left\{ \omega_{n,i}(\theta, T)\frac{\partial \omega_{n,i}(\theta, T)}{\partial T} + \left( \omega \xi_i(\theta, T, p)\frac{\partial \omega_{n,i}(\theta, T)}{\partial T} + \omega_{n,i}(\theta, T)\omega \frac{\partial \xi_i(\theta, T, p)}{\partial T} \right) j \right\}$$

The sensitivity analyzer 150 uses the Equation 4 to calculate the sensitivity function to the external loading pattern p applied to the carbon material. The sensitivity function to the orientation of the carbon material may be obtained as a partial derivative of the frequency response function using the external loading pattern p as a variable, as shown in a following Equation 7:

$$\frac{\partial H(\omega, \theta, T, p)}{\partial p} = \qquad \text{[Equation 7]}$$

$$\sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2}$$

$$\left\{ \omega_{n,i}(\theta, T)\omega \frac{\partial \xi_i(\theta, T, p)}{\partial p} j \right\}$$

The sensitivity analyzer 150 may calculate an sensitivity index of the carbon composite material 110 with respect to the orientation θ of the carbon material, the test temperature T, and the external loading pattern p, using the Equation 5 to the Equation 7.

In an embodiment, the sensitivity analyzer 150 may calculate a sensitivity index to the orientation θ of the carbon material using a following Equation 8:

$$I_{\theta,i,k} = \qquad \text{[Equation 8]}$$

$$\left| \omega_{n,i}(\theta_k, T)\frac{\partial \omega_{n,i}(\theta_k, T)}{\partial \theta} + \left( \omega \xi_i(\theta_k, T, p)\frac{\partial \omega_{n,i}(\theta_k, T)}{\partial \theta} + \omega_{n,i}(\theta_k, T)\omega \frac{\partial \xi_i(\theta_k, T, p)}{\partial \theta} \right) j \right|$$

where $I_{\theta,i,k}$ represents a sensitivity index of a k-th test target object at an i-th mode to the orientation θ of the carbon material.

In an embodiment, the sensitivity analyzer 150 may calculate a sensitivity index to the test temperature T using a following Equation 9:

$$I_{T,i,k} = \qquad \text{[Equation 9]}$$

$$\left| \omega_{n,i}(\theta, T_k)\frac{\partial \omega_{n,i}(\theta, T_k)}{\partial T} + \left( \omega \xi_i(\theta, T_k, p)\frac{\partial \omega_{n,i}(\theta, T_k)}{\partial T} + \omega_{n,i}(\theta, T_k)\omega \frac{\partial \xi_i(\theta, T_k, p)}{\partial T} \right) j \right|$$

where $I_{T,i,k}$ represents a sensitivity index of the k-th test target object at the i-th mode to the temperature T.

In one embodiment, the sensitivity analyzer 150 may calculate the sensitivity index to the external loading pattern p using a following Equation 10:

$$I_{p,i,k} = \left| \omega_{n,i}(\theta, T)\omega \frac{\partial \xi_i(\theta, T, p_k)}{\partial p} j \right| \qquad \text{[Equation 10]}$$

where $I_{p,i,k}$ represents a sensitivity index of the k-th test target object at the i-th mode to the external loading pattern p.

The sensitivity analyzer 150 may calculate a normalized sensitivity index by normalizing the sensitivity index as calculated via the Equations 8 to 10. The sensitivity analyzer 150 may calculate a first sensitivity index to the temperature T, a second sensitivity index to the external loading pattern (or a frequency spectrum pattern) p, and a third sensitivity index to the orientation θ for each of a plurality of test target objects and may calculate each of first to third normalized sensitivity indexes based on the first sensitivity indexes of the plurality of test target objects, the second sensitivity indexes of the plurality of test target objects, and the third sensitivity indexes of the plurality of test target objects, respectively.

In an embodiment, the sensitivity analyzer 150 may calculate a third normalized sensitivity index to the orientation θ of the carbon material using a following Equation 11:

$$\bar{I}_{\theta,i} = \frac{I_{\theta,i,k}}{\sum_k I_{\theta,i,k}} \qquad \text{[Equation 11]}$$

where $\bar{I}_{\theta,i}$ represents the third normalized sensitivity index to the orientation θ of the carbon material In one embodiment, the sensitivity analyzer 150 may calculate a first normalized sensitivity index to the test temperature T using a following Equation 12"

$$\bar{I}_{T,i} = \frac{I_{T,i,k}}{\sum_k I_{T,i,k}} \qquad \text{[Equation 12]}$$

where $\bar{I}_{T,i}$ represents the first normalized sensitivity index to the temperature T.

In an embodiment, the sensitivity analyzer 150 may calculate a second normalized sensitivity index to the external loading pattern p using a following Equation 13:

$$\bar{I}_{p,i} = \frac{I_{p,i,k}}{\sum_k I_{p,i,k}} \qquad \text{[Equation 13]}$$

where $\bar{I}_{p,i}$ represents the second normalized sensitivity index to the external loading pattern p.

Hereinafter, a device for analyzing dynamic characteristics of a carbon composite material based on the test temperature, the orientation of the carbon material, and the external loading pattern applied thereto, as described above will be experimentally implemented and results of the experiment will be described.

Figure 4B:
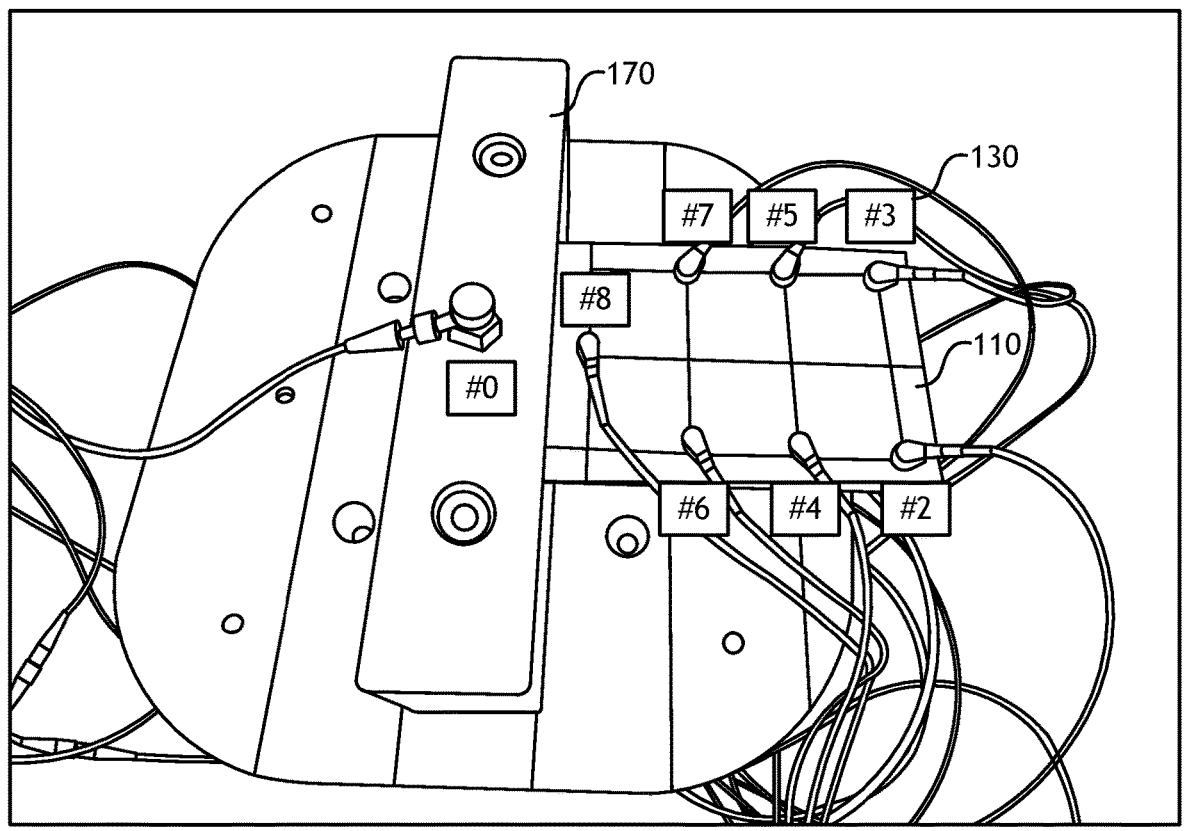

FIG. 4A and FIG. 4B are diagrams showing an example of configuring the device for analyzing the dynamic characteristics of the carbon composite material based on the test temperature, the carbon material orientation, and the external loading pattern, for an experiment.

FIG. 4A shows an example of an experimental configuration in which a first sensor 120 #1 is embodied as a load sensor. FIG. 4B shows an example of an experimental configuration in which a plurality of second sensors 130 #2, #3, #4, . . . #7 are arranged on the other side of the test object. The number and locations of the sensors may vary based on implementations.

Following Table 1 and Table 2 show a pattern of the physical force applied to the carbon composite material 110 from the vibration exciter 140, that is, the external loading pattern. The vibration exciter 140 may apply a random pattern and a harmonic pattern as shown in Table 1 to the carbon composite material 110.

[Table 1]

TABLE 1

| Test profile for random excitation | | |
|---|---|---|
| No. | Frequency (Hz) | Acceleration (g²/Hz) |
| 1 | 10 | 0 005 |
| 2 | 500 | 0.005 |

TABLE 2

| Test profile for harmonic excitation | | |
|---|---|---|
| No. | Frequency (Hz) | Acceleration |
| 1 | 10 | 0.5 |
| 2 | 500 | 0.5 |

In a tester, a random pattern in a 10 Hz frequency band and a random pattern in a 500 Hz frequency band were used as a random external loading pattern. A harmonic pattern in a 10 Hz frequency band and a harmonic pattern in a 500 Hz frequency band were used as a harmonic external loading pattern.

A following table 3 shows a test temperature set via the thermostat 160 in the test.

TABLE 3

| Temperature conditions in the uniaxial excitation test | |
|---|---|
| No. | Temperature |
| 1 | −8° C. |
| 2 | 20° C. |
| 3 | 50° C. |
| 4 | 80° C. |
| 5 | 105° C. |

The tests were performed on five carbon material orientations (θ1=0°, θ2=30°, θ3=45°, θ4=60°, θ5=90°), on two external loading patterns (p1=harmonic, p2=random) and on five test temperatures (T1=−8° C., T2=+20° C., T3=+50° C., T4=+80° C., and T5=+105° C.). Hereinafter, the frequency response function and the normalized sensitivity index calculated via the sensitivity analyzer 150 under the corresponding test conditions will be described. The sensitivity analyzer 150 may calculate the frequency response function of the carbon composite material based on the test temperature T, the external loading pattern p, and the orientation θ of the carbon material using the above Equation 4.

FIG. 5 is graphs of a frequency response function based on a test temperature of a carbon composite material, and an external loading pattern type applied thereto when a carbon fiber orientation is 0°.

In FIG. 5, (a) is a diagram showing the frequency response function calculated based on a variation of the test temperature when a harmonic pattern is applied to a carbon composite material having a carbon fiber orientation of 0°. In FIG. 5, (b) is a diagram showing the frequency response function calculated based on a variation of the test temperature when a random pattern is applied to a carbon composite material having a carbon fiber orientation of 0°.

FIG. 6 is graphs of a frequency response function based on a test temperature of a carbon composite material, and an external loading pattern type applied thereto when a carbon fiber orientation is 30°.

In FIG. 6, (a) is a diagram showing the frequency response function calculated based on a variation of the test temperature when a harmonic pattern is applied to a carbon composite material having a carbon fiber orientation of 30°. In FIG. 6, (b) is a diagram showing the frequency response function calculated based on a variation of the test temperature when a random pattern is applied to a carbon composite material having a carbon fiber orientation of 30°.

FIG. 7 is graphs of a frequency response function based on a test temperature of a carbon composite material, and an external loading pattern type applied thereto when a carbon fiber orientation is 45°.

In FIG. 7, (a) is a diagram showing the frequency response function calculated based on a variation of the test temperature when a harmonic pattern is applied to a carbon composite material having a carbon fiber orientation of 45°. In FIG. 7, (b) is a diagram showing the frequency response function calculated based on a variation of the test temperature when a random pattern is applied to a carbon composite material having a carbon fiber orientation of 45°.

FIG. 8 is graphs of a frequency response function based on a test temperature of a carbon composite material, and an external loading pattern type applied thereto when a carbon fiber orientation is 60°.

In FIG. 8, (a) is a diagram showing the frequency response function calculated based on a variation of the test temperature when a harmonic pattern is applied to a carbon composite material having a carbon fiber orientation of 60°. In FIG. 8, (b) is a diagram showing the frequency response function calculated based on a variation of the test temperature when a random pattern is applied to a carbon composite material having a carbon fiber orientation of 60°.

FIG. 9 is graphs of a frequency response function based on a test temperature of a carbon composite material, and an external loading pattern type applied thereto when a carbon fiber orientation is 90°.

In FIG. 9, (a) is a diagram showing the frequency response function calculated based on a variation of the test temperature when a harmonic pattern is applied to a carbon composite material having a carbon fiber orientation of 90°. In FIG. 9, (b) is a diagram showing the frequency response function calculated based on a variation of the test temperature when a random pattern is applied to a carbon composite material having a carbon fiber orientation of 90°.

A following table 4 shows a resonance frequencies $\omega_{n,i}$ of the test target carbon composite material derived based on the frequency response function calculated under different test conditions. Table 5 shows a damping coefficient of the test target carbon composite material.

TABLE 4

Table 4. Variation of the resonance frequency ($\omega_{n,\ 1}$) according to different parameter conditions

| | Harmonic | | | | | Random | | | | |
|---|---|---|---|---|---|---|---|---|---|---|
| θ | −8° C. | 20° C. | 50° C. | 80° C. | 105° C. | −8° C. | 20° C. | 50° C. | 80° C. | 105° C. |
| 0° | 230.6 | 247.0 | 246.5 | 250.5 | 252.0 | 235.5 | 246.5 | 246.0 | 249.5 | 253.0 |
| 30° | 141.0 | 123.5 | 121.5 | 119.5 | 116.0 | 141.5 | 123.0 | 121.5 | 120.0 | 114.5 |
| 45° | 100.0 | 97.0 | 93.5 | 91.0 | 90.0 | 99.0 | 96.0 | 94.0 | 91.5 | 91.5 |
| 60° | 85.0 | 68.5 | 72.0 | 70.5 | 670 | 85.0 | 68.5 | 71.5 | 71.0 | 67.5 |
| 90° | 77.0 | 73.0 | 73.0 | 64.5 | 63.0 | 76.5 | 73.5 | 66.0 | 64.0 | 64.5 |

TABLE 5

Table 5. Variation of damping coefficient ($\xi_i$) according to different parameter conditions

| | Harmonic | | | | | Random | | | | |
|---|---|---|---|---|---|---|---|---|---|---|
| θ | −8° C. | 20° C. | 50° C. | 80° C. | 105° C. | −8° C. | 20° C. | 50° C. | 80° C. | 105° C. |
| 0° | 1.1 | 1.1 | 0.9 | 1.1 | 0.9 | 1.6 | 1.2 | 0.9 | 1.0 | 0.9 |
| 30° | 16.1 | 2.1 | 1.4 | 1.7 | 2.8 | 18.5 | 2.2 | 1.6 | 0.8 | 5.1 |
| 45° | 2.6 | 6.6 | 2.4 | 2.0 | 3.3 | 2.4 | 6.1 | 2.4 | 2.1 | 2.4 |
| 60° | 2.2 | 14.5 | 3.8 | 2.6 | 2.4 | 2.6 | 13.0 | 3.8 | 2.9 | 8.5 |
| 90° | 2.8 | 1.8 | 2.0 | 2.7 | 2.7 | 2.7 | 2.0 | 2.4 | 3.1 | 5.7 |

FIG. 10 is graphs of a resonance frequency $\omega_{n,l}$ based on a test temperature variation of a carbon composite material.

In FIG. 10, (a) is a graph of the resonance frequency $\omega_{n,l}$ of the carbon composite material based on a variation of the test temperature and based on the orientation of the carbon fiber when a harmonic pattern is applied to the carbon composite material. In FIG. 10, (b) is a graph of the resonance frequency of the carbon composite material based on a variation of the test temperature and based on the orientation of the carbon fiber when a random pattern is applied to the carbon composite material.

FIG. 11 is graphs of a damping coefficient ζ1 based on a test temperature variation of a carbon composite material.

In FIG. 11, (a) is a graph of the damping coefficient ζ1 of the carbon composite material based on a variation of the test temperature and based on the orientation of the carbon fiber when a harmonic pattern is applied to the carbon composite material. In FIG. 11, (b) is a graph of the damping coefficient of the carbon composite material based on a variation of the test temperature and based on the orientation of the carbon fiber when a random pattern is applied to the carbon composite material.

FIG. 12 is graphs of a resonance frequency $\omega_{n,l}$ based on a variation in an orientation of a carbon fiber.

In FIG. 12, (a) is a graph of the resonance frequency ω of the carbon composite material based on a variation of the orientation of the carbon fiber and based on the test temperature when a harmonic pattern is applied to the carbon composite material. In FIG. 12, (b) is a graph of the resonance frequency of the carbon composite material based on a variation of the orientation of the carbon fiber based on the test temperature when a random pattern is applied to the carbon composite material.

FIG. 13 is graphs of a damping coefficient ζ1 based on a variation of an orientation of a carbon fiber.

In FIG. 13, (a) is a graph of the damping coefficient ζ1 of the carbon composite material based on a variation of the orientation of the carbon fiber and based on the test temperature when a harmonic pattern is applied to the carbon composite material. In FIG. 13, (b) is a graph of the damping coefficient of the carbon composite material based on a variation of the orientation of the carbon fiber and based on the test temperature when a random pattern is applied to the carbon composite material.

The sensitivity analyzer 150 may calculate a polynomial of each of a resonance frequency curve and a damping coefficient curve using a curve fitted function. A following table 6 shows a result of calculating a curve fitted polynomial of each of the resonance frequency curves in FIG. 10 and FIG. 12, based on a specific parameter. A following table 7 shows a result of calculating a curve fitted polynomial of each of the damping coefficient curves in FIG. 11 and FIG. 13, based on a specific parameter.

TABLE 6

Curve-fitted polynomial function of the fist resonance frequency ($\omega_{n,\ 1}$) with respect to the parameters of interest

| Parameter | Harmonic | Random |
|---|---|---|
| $\theta_1 = 0°$ | $-0.007 \cdot T^2 + 0.40 \cdot T + 239.99$ | $-0.008 \cdot T^2 + 0.42 \cdot T + 239.66$ |
| $\theta_2 = 30°$ | $-0.0001 \cdot T^3 - 0.012 \cdot T^2 - 0.71 \cdot T + 134.29$ | $-0.0001 \cdot T^3 - 0.014 \cdot T^2\ 0.77 \cdot T + 134.20$ |
| $\theta_3 = 45°$ | $-0.0004 \cdot T^2 - 0.111 \cdot T + 99.19$ | $-0.0001 \cdot T^2 -0.095 \cdot T + 98.18$ |
| $\theta_4 = 60°$ | $-0.0001 \cdot T^3 - 0.014 \cdot T^2 - 0.66 \cdot T + 78.36$ | $-0.0001 \cdot T^3 + 0.014 \cdot T^2 - 0.68 \cdot T + 78.28$ |
| $\theta_5 = 90°$ | $-0.0006 \cdot T^2 - 0.17 \cdot T + 75.87$ | $-0.0025 \cdot T^2 - 0.11 \cdot T + 75.94$ |

TABLE 6-continued

Curve-fitted polynomial function of the fist resonance frequency
($\omega_{n\_1}$) with respect to the parameters of interest

| Parameter | Harmonic | Random |
|---|---|---|
| $T_1 = -8°$ C. | $0.0001 \cdot \theta^3 + 0.018 \cdot \theta^2 - 3.86 \cdot \theta + 236.29$ | $0.0001 \cdot \theta^3 + 0.017 \cdot \theta^2 - 3.81 \cdot \theta + 235.84$ |
| $T_2 = 20°$ C. | $-0.0001 \cdot \theta^3 + 0.041 \cdot \theta^2 - 5.19 \cdot \theta + 246.66$ | $-0.0001 \cdot \theta^3 + 0.042 \cdot \theta^2 - 5.21 \cdot \theta + 246.18$ |
| $T_3 = 50°$ C. | $-0.0002 \cdot \theta^3 + 0.059 \cdot \theta^2 - 5.69 \cdot \theta + 246.34$ | $-0.0002 \cdot \theta^3 + 0.0597 - 5.63 \cdot \theta + 245.81$ |
| $T_4 = 80°$ C. | $-0.0002 \cdot \theta^3 + 0.066 \cdot \theta^2 - 6.09 \cdot \theta + 250.35$ | $-0.0002 \cdot \theta^3 + 0.0665 - 6.02 \cdot \theta + 249.36$ |
| $T_5 = 105°$ C. | $-0.0003 \cdot \theta^3 + 0.070 \cdot \theta^3 - 6.32 \cdot \theta + 251.74$ | $-0.0003 \cdot \theta^3 + 0.075 \cdot \theta^2 - 6.50 \cdot \theta + 252.66$ |

TABLE 7

Curve-fitted polynomial function of the fist modal damping
coefficient ($\xi_1$) with respect to the parameters of interest

| Parameter | Harmonic | Random |
|---|---|---|
| $\theta_1 = 0°$ | $0.0001 \cdot T^2 - 0.0046 \cdot T + 1.077$ | $0.0002 \cdot T^2 - 0.019 \cdot T + 1.44$ |
| $\theta_2 = 30°$ | $0.0094 \cdot T^2 - 0.57 \cdot T + 10.75$ | $0.0092 \cdot T^2 - 0.62 \cdot T + 12.57$ |
| $\theta_3 = 45°$ | $-0.0055 \cdot T^2 - 0.16 \cdot T + 4.48$ | $-0.0046 \cdot T^2 - 0.15 \cdot T + 4.065$ |
| $\theta_4 = 60°$ | $0.0001 \cdot T^3 - 0.014 \cdot T^2 - 0.48 \cdot T + 7.60$ | $0.0001 \cdot T^3 - 0.014 \cdot T^2 - 0.44 \cdot T + 7.53$ |
| $\theta_5 = 90°$ | $-0.0004 \cdot T^2 - 0.022 \cdot T + 2.59$ | $-0.019 \cdot T + 2.51$ |
| $T_1 = -8°$ C. | $0.0003 \cdot \theta^3 - 0.039 \cdot \theta^2 + 1.32 \cdot \theta + 1.38$ | $0.0003 \cdot \theta^3 - 0.043 \cdot \theta^2 + 1.48 \cdot \theta + 1.95$ |
| $T_2 = 20°$ C. | $-0.0002 \cdot \theta^3 + 0.027 \cdot \theta^2 - 0.61 \cdot \theta + 1.20$ | $-0.0002 \cdot \theta^3 + 0.024 \cdot \theta^2 - 0.52 \cdot \theta + 1.29$ |
| $T_3 = 50°$ C. | $0.0045 \cdot \theta^2 - 0.089 \cdot \theta + 0.91$ | $0.0038 \cdot \theta^2 - 0.067 \cdot \theta + 092$ |
| $T_4 = 80°$ C. | $0.0008 \cdot \theta^2 - 0.0007 \cdot \theta + 1.11$ | $0.0036 \cdot \theta^2 - 0.086 \cdot \theta + 0.99$ |
| $T_5 = 105°$ C. | $-0.0053 \cdot \theta^2 + 0.20 \cdot \theta + 0.87$ | $-0.0036 \cdot \theta^2 + 0.0012 \cdot \theta + 1.084$ |

The sensitivity analyzer 150 may calculate a sensitivity function to the temperature T, the external loading pattern (or the frequency spectrum pattern) p, and the orientation θ of the carbon fiber for the plurality of test target objects using the Equation 5 to the Equation 7. Then, thee sensitivity analyzer 150 may use the Equation 8 to the Equation 10 to calculate a sensitivity index to the temperature T, the external loading pattern p, and the orientation θ of the carbon fiber for the plurality of test target objects. The sensitivity analyzer 150 may calculate a normalized sensitivity index based on each of the sensitivity indexes as calculated for the plurality of test target objects.

In an embodiment, the sensitivity analyzer 150 may compare the normalized sensitivity index values and output a result of analyzing physical characteristics of the test target objects, based on the comparison results. For example, the sensitivity analyzer 150 may compare the normalized sensitivity index values, select a test target object having high physical stability under the test conditions based on the comparison results, and output the selected object.

FIG. 14 is a graph of a normalized sensitivity index of a carbon composite material to an orientation of a carbon fiber for two external loading patterns. FIG. 14 is a graph of the result of calculating the normalized sensitivity index of five carbon composite materials having different orientations of the carbon material (carbon fiber) (θ1=0°, θ2=30°, θ3=45°, θ4=60°, and θ5=) 90°.

FIG. 15 is a graph of a normalized sensitivity index of a carbon composite material to a test temperature for two external loading patterns. FIG. 16 is a graph of a normalized sensitivity index of a carbon composite material to the external loading pattern.

Referring to FIG. 14, it may be seen that a first carbon composite material #1 exhibits the lowest sensitivity index value to the two external loading patterns at the test temperature. The sensitivity analyzer 150 may determine that the first carbon composite material #1 has the most robust physical characteristic against the corresponding external loading pattern at the corresponding test temperature, and may display the determination result on a screen. Referring to FIG. 14, it may be seen that a second carbon composite material #2 and a fourth carbon composite material #4 exhibit higher sensitivity index values to the two external loading patterns at the corresponding test temperature than those of other carbon composite materials. Thus, the sensitivity analyzer 150 may determine that the second carbon composite material #2 and the fourth carbon composite material #4 have more fragile physical characteristics against the corresponding test external loading pattern at the corresponding test temperature than those of other carbon composite materials and may display the determination result on the screen.

Referring to FIG. 15, it may be identified that the sensitivity index value to the test temperature of the test target carbon composite material is the highest at −8° C. and is the lowest at 105° C. Thus, the sensitivity analyzer 150 may determine that the corresponding test target carbon composite material is the physically weakest at −8° C. and the most robust at 105° C., and may display the determination result on the screen.

FIG. 17 is a flowchart illustrating a method for analyzing dynamic characteristics of a carbon composite material based on a target temperature, an orientation of a carbon material, and an external loading pattern according to an embodiment of the present disclosure.

Referring to FIG. 17, the method for analyzing the dynamic characteristics of the carbon composite material based on the test temperature, the carbon material orientation and the external loading pattern may include step S1710 in which the thermostat 160 sets the test temperature in the test space under control of the analyzer; step 1720 in which the vibration exciter 140 sets the external loading pattern under control of the analyzer and applies a physical force to the test target carbon composite material located in the test space, based on the set external loading pattern; step S1730 in which the first sensor 120 measures the physical force applied to the carbon composite material 110 from the vibration exciter 140; and step S1740 in which the second sensor 130 collects the vibration of the carbon composite material 110 caused by the physical force.

In one embodiment, the vibration exciter 140 applies a physical force with at least two external loading patterns. The external loading patterns may include a random pattern and a harmonic pattern.

The sensitivity analyzer 150 calculates the frequency response function of the carbon composite material based on the physical force signal measured by the first sensor 120 and the vibration signal collected by the second sensor 130 and calculates the sensitivity of the carbon composite material to each of the variations of the orientation θ of the carbon material contained in the carbon composite material, the test temperature T, and the external loading pattern or the frequency spectrum pattern p applied thereto, based on the calculated frequency response function (step 1750).

In an embodiment, the sensitivity analyzer 150 may calculate a frequency response function based on the test temperature T, the external loading pattern p and the orientation θ of the carbon material using the Equation 4.

In one embodiment, the sensitivity analyzer 150 may calculate a sensitivity function to the temperature T, the external loading pattern p and the orientation θ of the carbon fiber for a plurality of test target objects using the Equation 5 to the Equation 7, and may calculate the sensitivity index to the test temperature T, the external loading pattern p, and the orientation θ of the carbon fiber for the plurality of test target objects using the Equation 8 to the Equation 10. The sensitivity analyzer 150 may calculate a normalized sensitivity index based on each sensitivity index calculated for the plurality of test target objects, and may compare the normalized sensitivity index values with each other and output the result of analyzing the physical characteristics of the test target object, based on the comparison result.

The method for analyzing the dynamic characteristics using the device for analyzing the dynamic characteristics of the carbon composite material based on the test temperature, the orientation of the carbon material and the external loading pattern applied thereto, as described with reference to FIG. 1 to FIG. 16 may be implemented in a form of a recording medium containing instructions executable by a computer, such as an application or a module executed by the computer.

The computer-readable medium may include any available media that may be accessed by the computer, and may include both volatile and nonvolatile media, and removable and non-removable media. Further, the computer-readable medium may include both computer storage media and communication media. The computer storage media may include both volatile and nonvolatile, and removable and non-removable media as implemented using any method or techniques for storage of information such as computer readable instructions, data structures, modules or other data. The communication media typically includes computer readable instructions, data structures, program modules, or other data including a modulated data signal such as a carrier wave, or other transmission mechanism, and includes any information delivery media.

The module may mean hardware capable of performing functions and operations as described herein, or may mean a computer program code capable of performing specific functions and operations. Alternatively, the module may refer to an electronic recording medium, such as a processor, on which a computer program code capable of performing a specific function and operation is mounted.

The present disclosure has been described with reference to the embodiments, but the technical idea of the present disclosure is not limited to the above embodiments. Various embodiments of the device for analyzing the dynamic characteristics of the carbon composite material based on the temperature, the orientation of the carbon material, and the external loading pattern and the method for analyzing the dynamic characteristics using the same may be implemented within a scope not departing from the technical idea of the present disclosure.

What is claimed is:

1. A device for analyzing dynamic characteristics of a carbon composite material based on a test temperature, an orientation of a carbon material, and an external loading pattern applied thereto, the device comprising:
    a thermostat configured to set a test temperature under control of a sensitivity analyzer and to maintain a test temperature in a test space at the set temperature;
    a vibration exciter configured to set an external loading pattern under control of the sensitivity analyzer and to apply a physical force to a carbon composite material as a test target located in the test space, based on the set external loading pattern;
    a first sensor for measuring a physical force applied to the carbon composite material from the vibration exciter;
    a second sensor in contact with one side of the carbon composite material for collecting vibration of the carbon composite material caused by the physical force; and
    a sensitivity analyzer configured to:
        control the thermostat to set the test temperature in the test space, and control the vibration exciter to set the external loading pattern;
        calculate a frequency response function of the carbon composite material based on a physical force signal measured by the first sensor and a vibration signal collected by the second sensor; and
        calculate a sensitivity of the carbon composite material to each of variations in the test temperature, an orientation of a carbon material contained in the carbon composite material, and the external loading pattern applied thereto, based on the calculated frequency response function.

2. The device of claim 1, wherein the carbon composite material as the test target includes carbon fiber reinforced plastic (CFRP) containing a carbon fiber having a single orientation at a specific angle, wherein the orientation of the carbon material includes an orientation of the carbon fiber.

3. The device of claim 1, wherein the vibration exciter applies the physical force based on at least two external loading patterns, wherein the at least two external loading patterns include a random pattern and a harmonic pattern.

4. The device of claim 1, wherein the first sensor includes a load sensor positioned between the vibration exciter and the carbon composite material to measure the physical force.

5. The device of claim 1, wherein the second sensor includes an acceleration sensor, wherein the second sensor includes a plurality of second sensors to collect vibrations at a plurality of positions on the carbon composite material.

6. The device of claim 1, wherein a modal damping coefficient of the frequency response function is based on the test temperature, the external loading pattern, and the orientation of the carbon material, wherein a resonance frequency of the frequency response function is based on the test temperature and the orientation of the carbon material.

7. The device of claim 6, wherein the sensitivity analyzer is further configured to calculate the frequency response function based on an average value of values respectively measured by the plurality of second sensors and based on a value measured by the first sensor.

8. The device of claim 7, wherein the sensitivity analyzer is further configured to calculate the frequency response function using a following Equation 1:

$$H(\omega, \theta, T, p) = \sum_{i=1}^{N} \frac{r_i^e}{(\omega_{n,i}(\theta, T))^2 - \omega^2 + 2\omega_{n,i}(\theta, T)\omega\xi_i(\theta, T, p)j} \quad \text{[Equation 1]}$$

wherein a resonance frequency at an i-th mode is defined as $\omega_{n,i}$, $\omega$ denotes an angular frequency of $2\pi f$, f denotes a frequency, and $r_i^e$ denotes a residual, $\zeta i$ denotes a damping coefficient at the i-th mode, wherein $\theta$ denotes the orientation of the carbon material contained in the carbon composite material, T denotes the test temperature, and p denotes the external loading pattern or a frequency spectrum pattern applied to the carbon composite material from the vibration exciter.

9. The device of claim 8, wherein the sensitivity analyzer is further configured to calculate a sensitivity function of the carbon composite material to the orientation of the carbon material using a following Equation 2:

$$\frac{\partial H(\omega, \theta, T, p)}{\partial \theta} = \quad \text{[Equation 2]}$$

$$\sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left( \omega\xi_i(\theta, T, p)\frac{\partial \omega_{n,i}(\theta, T)}{\partial \theta} + \omega_{n,i}(\theta, T)\omega\frac{\partial \xi_i(\theta, T, p)}{\partial \theta} \right)$$

10. The device of claim 9, wherein the sensitivity analyzer is further configured to calculate a sensitivity index of the carbon composite material to the orientation of the carbon material using a following Equation 3, and to calculate a normalized sensitivity index to the orientation of the carbon material using a following Equation 4:

$$I_{\theta,i,k} = \left| \omega_{n,i}(\theta_k, T)\frac{\partial \omega_{n,i}(\theta_k, T)}{\partial \theta} + \left( \omega\xi_i(\theta_k, T, p)\frac{\partial \omega_{n,i}(\theta_k, T)}{\partial \theta} + \omega_{n,i}(\theta_k, T)\omega\frac{\partial \xi_i(\theta_k, T, p)}{\partial \theta} \right)j \right| \quad \text{[Equation 3]}$$

wherein $I_{\theta,I,k}$ denotes a sensitivity index of a k-th test target at the i-th mode to the orientation $\theta$ of the carbon material, $$\bar{I}_{\theta,i} = \frac{I_{\theta,i,k}}{\sum_k I_{\theta,i,k}} \quad \text{[Equation 4]}$$

wherein $\bar{I}_{\theta,i}$ denotes the normalized sensitivity index to the orientation $\theta$ of the carbon material.

11. The device of claim 8, wherein the sensitivity analyzer is further configured to calculate a sensitivity function of the carbon composite material to the test temperature using a following Equation 5:

$$\frac{\partial H(\omega, \theta, T, p)}{\partial T} = \quad \text{[Equation 5]}$$

$$\sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T)\frac{\partial \omega_{n,i}(\theta, T)}{\partial T} + \left( \omega\xi_i(\theta, T, p)\frac{\partial \omega_{n,i}(\theta, T)}{\partial T} + \omega_{n,i}(\theta, T)\omega\frac{\partial \xi_i(\theta, T, p)}{\partial T} \right)j \right\}$$

12. The device of claim 11, wherein the sensitivity analyzer is further configured to calculate a sensitivity index to the test temperature using a following Equation 6, and calculate a normalized sensitivity index to the test temperature using a following Equation 7:

$$I_{T,i,k} = \left| \omega_{n,i}(\theta, T_k)\frac{\partial \omega_{n,i}(\theta, T_k)}{\partial T} + \left( \omega\xi_i(\theta, T_k, p)\frac{\partial \omega_{n,i}(\theta, T_k)}{\partial T} + \omega_{n,i}(\theta, T_k)\omega\frac{\partial \xi_i(\theta, T_k, p)}{\partial T} \right)j \right| \quad \text{[Equation 6]}$$

wherein $I_{T,I,k}$ denotes a sensitivity index of a k-th test target at the i-th mode to the test temperature T, $$\bar{I}_{T,i} = \frac{I_{T,i,k}}{\sum_k I_{T,i,k}} \quad \text{[Equation 7]}$$

wherein $\bar{I}_{T,i}$ denotes the normalized sensitivity index to the test temperature T.

13. The device of claim 8, wherein the sensitivity analyzer is further configured to calculate a sensitivity function of the carbon composite material to the external loading pattern using a following Equation 8:

$$\frac{\partial H(\omega, \theta, T, p)}{\partial p} = \quad \text{[Equation 8]}$$

$$\sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T)\omega\frac{\partial \xi_i(\theta, T, p)}{\partial p} j \right\}.$$

14. The device of claim 13, wherein the sensitivity analyzer is further configured to calculates a sensitivity index of the carbon composite material to the external loading pattern using a following Equation 9, and calculate a normalized sensitivity index to the external loading pattern using a following Equation 10:

$$I_{p,i,k} = \left| \omega_{n,i}(\theta, T)\omega\frac{\partial \xi_i(\theta, T, p_k)}{\partial p} j \right| \quad \text{[Equation 9]}$$

wherein $I_{p,I,k}$ denotes a sensitivity index of a k-th test target at the i-th mode to the external loading pattern p, $$\bar{I}_{p,i} = \frac{I_{p,i,k}}{\sum_k I_{p,i,k}} \quad \text{[Equation 10]}$$

wherein $\bar{I}_{p,i}$ denotes the normalized sensitivity index to the external loading pattern p.

15. A method for analyzing dynamic characteristics of a carbon composite material based on a test temperature, an orientation of a carbon material, and an external loading pattern applied thereto, the method comprising:
  setting, by a thermostat, a test temperature under control of a sensitivity analyzer, and maintaining, by the thermostat, a test temperature in a test space at the set temperature;
  setting, a vibration exciter, an external loading pattern under control of the sensitivity analyzer, and applying, by the vibration exciter, a physical force to a carbon composite material as a test target located in the test space, based on the set external loading pattern;
  measuring, by a first sensor, a physical force applied to the carbon composite material from the vibration exciter;
  collecting, by a second sensor, vibration of the carbon composite material caused by the physical force;
  calculating, by the sensitivity analyzer, a frequency response function of the carbon composite material based on a physical force signal measured by the first sensor and a vibration signal collected by the second sensor; and
  calculating, by the sensitivity analyzer, a sensitivity of the carbon composite material to each of variations in the test temperature, an orientation of a carbon material contained in the carbon composite material, and the external loading pattern applied thereto, based on the calculated frequency response function.

16. The method of claim 15, wherein a modal damping coefficient of the frequency response function is based on the test temperature, the external loading pattern, and the orientation of the carbon material, wherein a resonance frequency of the frequency response function is based on the test temperature and the orientation of the carbon material.

17. The method of claim 16, wherein calculating the frequency response function includes calculating the frequency response function using a following Equation 1:

$$H(\omega, \theta, T, p) = \sum_{i=1}^{N} \frac{r_i^e}{(\omega_{n,i}(\theta, T))^2 - \omega^2 + 2\omega_{n,i}(\theta, T)\omega\xi_i(\theta, T, p)j} \quad \text{[Equation 1]}$$

wherein a resonance frequency at an i-th mode is defined as $\omega_{n,i}$, $\omega$ denotes an angular frequency of $2\pi f$, f denotes a frequency, and $r_i^e$ denotes a residual, $\zeta i$ denotes a damping coefficient at the i-th mode, wherein $\theta$ denotes the orientation of the carbon material contained in the carbon composite material, T denotes the test temperature, and p denotes the external loading pattern or a frequency spectrum pattern applied to the carbon composite material from the vibration exciter.

18. The method of claim 17, wherein calculating the sensitivity includes calculating a sensitivity function of the carbon composite material to the orientation of the carbon material using a following Equation 2:

$$\frac{\partial H(\omega, \theta, T, p)}{\partial \theta} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T)\frac{\partial \omega_{n,i}(\theta, T)}{\partial \theta} + \left( \omega\xi_i(\theta, T, p)\frac{\partial \omega_{n,i}(\theta, T)}{\partial \theta} + \omega_{n,i}(\theta, T)\omega\frac{\partial \xi_i(\theta, T, p)}{\partial \theta} \right)j \right\}. \quad \text{[Equation 2]}$$

19. The method of claim 17, wherein calculating the sensitivity includes calculating a sensitivity function of the carbon composite material to the test temperature using a following Equation 5:

$$\frac{\partial H(\omega, \theta, T, p)}{\partial T} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T)\frac{\partial \omega_{n,i}(\theta, T)}{\partial T} + \left( \omega\xi_i(\theta, T, p)\frac{\partial \omega_{n,i}(\theta, T)}{\partial T} + \omega_{n,i}(\theta, T)\omega\frac{\partial \xi_i(\theta, T, p)}{\partial T} \right)j \right\}. \quad \text{[Equation 5]}$$

20. The method of claim 17, wherein calculating the sensitivity includes calculating a sensitivity function of the carbon composite material to the external loading pattern using a following Equation 8:

$$\frac{\partial H(\omega, \theta, T, p)}{\partial p} = \sum_{i=1}^{N} \frac{2r_i^e}{[(\omega_{n,i}(\theta, T))^2 - \omega^2 + 2\omega_{n,i}(\theta, T)\omega\xi_i(\theta, T, p)j]^2} \left\{ \omega_{n,i}(\theta, T)\omega\frac{\partial \xi_i(\theta, T, p)}{\partial p}j \right\}. \quad \text{[Equation 8]}$$

* * * * *